United States Patent
Nakagawa et al.

(10) Patent No.: US 10,826,365 B2
(45) Date of Patent: Nov. 3, 2020

(54) MOTOR

(71) Applicant: Samsung Electronics Co., Ltd., Suwon-si (KR)

(72) Inventors: Yukinori Nakagawa, Yokohama (JP); Yasuyuki Sonoda, Yokohama (JP); Yasumasa Nagasaki, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/228,477

(22) Filed: Dec. 20, 2018

(65) Prior Publication Data

US 2019/0190362 A1 Jun. 20, 2019

(30) Foreign Application Priority Data

Dec. 20, 2017 (JP) .................................. 2017-243803
Nov. 22, 2018 (KR) .......................... 10-2018-0145224

(51) Int. Cl.
| | | |
|---|---|---|
| *H02K 16/02* | (2006.01) | |
| *H02K 11/21* | (2016.01) | |
| *H02K 21/12* | (2006.01) | |
| *H02K 3/32* | (2006.01) | |
| *H02K 1/14* | (2006.01) | |
| *H02K 3/18* | (2006.01) | |

(Continued)

(52) U.S. Cl.
CPC .............. *H02K 16/02* (2013.01); *H02K 1/148* (2013.01); *H02K 3/18* (2013.01); *H02K 3/325* (2013.01); *H02K 11/21* (2016.01); *H02K 21/12* (2013.01); *D06F 23/04* (2013.01); *D06F 37/304* (2013.01); *D06F 37/40* (2013.01); *H02K 29/03* (2013.01)

(58) Field of Classification Search
CPC .......... H02K 3/18; H02K 11/21; H02K 16/02; H02K 21/12
USPC ....... 310/68 B, 156.26, 156.34, 156.37, 214, 310/265, 405
See application file for complete search history.

(56) References Cited

U.S. PATENT DOCUMENTS 2,371,268 A * 3/1945 Scofield ................. H02K 23/40
310/216.097
6,369,483 B1 * 4/2002 Hill ......................... H02K 1/148
310/429

(Continued)

FOREIGN PATENT DOCUMENTS

| | | |
|---|---|---|
| EP | 1271752 A1 | 1/2003 |
| JP | 2007151293 A | 6/2007 |

(Continued)

OTHER PUBLICATIONS

Machine Translation JP2009100572 (Year: 2009).*

(Continued)

*Primary Examiner* — Jose A Gonzalez Quinones

(57) ABSTRACT

Disclosed is a motor improved to increase a magnetization property. The motor includes a stator including a plurality of teeth arranged to be spaced apart in a circumferential direction and a rotor configured to include a plurality of magnets arranged inside or outside the stator and to rotate while electromagnetically interacting with the stator. The plurality of teeth include first teeth having a first cross section and second teeth having a second cross section larger than the first cross section and is configured to switch at least one magnetic pole of the plurality of magnets by using the second teeth.

19 Claims, 53 Drawing Sheets

(51) Int. Cl.
*H02K 29/03* (2006.01)
*D06F 37/30* (2020.01)
*D06F 37/40* (2006.01)
*D06F 23/04* (2006.01)

(56) References Cited

U.S. PATENT DOCUMENTS

| | | | |
|---|---|---|---|
| 6,727,632 B2 * | 4/2004 | Kusase | H02K 1/27 |
| | | | 310/112 |
| 2001/0008354 A1 * | 7/2001 | Minagawa | H02K 16/02 |
| | | | 310/113 |
| 2004/0075359 A1 | 4/2004 | Muller et al. | |
| 2005/0231060 A1 * | 10/2005 | Vollmer | H02K 1/146 |
| | | | 310/216.112 |
| 2006/0022550 A1 * | 2/2006 | Otsuji | H02K 3/325 |
| | | | 310/194 |
| 2009/0243406 A1 * | 10/2009 | Jack | H02K 1/02 |
| | | | 310/44 |
| 2013/0033136 A1 | 2/2013 | McMullen | |
| 2013/0093276 A1 * | 4/2013 | Kim | H02K 16/00 |
| | | | 310/114 |
| 2014/0091662 A1 * | 4/2014 | Kim | H02K 7/14 |
| | | | 310/114 |

FOREIGN PATENT DOCUMENTS

| | | | |
|---|---|---|---|
| JP | 2007166852 A | | 6/2007 |
| JP | 2008067493 A | | 3/2008 |
| JP | 2009100572 A | * | 5/2009 |
| JP | 2017123767 A | | 7/2017 |
| KR | 20150022525 A | * | 3/2015 |

OTHER PUBLICATIONS

ISA/KR, "International Search Report and Written Opinion of the International Searching Authority," International Application No. PCT/KR2018/016322, dated Apr. 22, 2019, 8 pages.

* cited by examiner

FIG. 9

| POSITION OF TEETH | 1 | 2 | 3 | 4 | 5 | 6 | 7 | 8 | 9 | 10 | ... | 28 | 29 | 30 |
|---|---|---|---|---|---|---|---|---|---|---|---|---|---|---|
| THREE PHASE | U | V | W | U | V | W | U | V | W | U | ... | U | V | W |
| STATOR CORE | LARGE | SMALL | LARGE | SMALL | LARGE | SMALL | LARGE | SMALL | LARGE | SMALL | ... | SMALL | LARGE | SMALL |

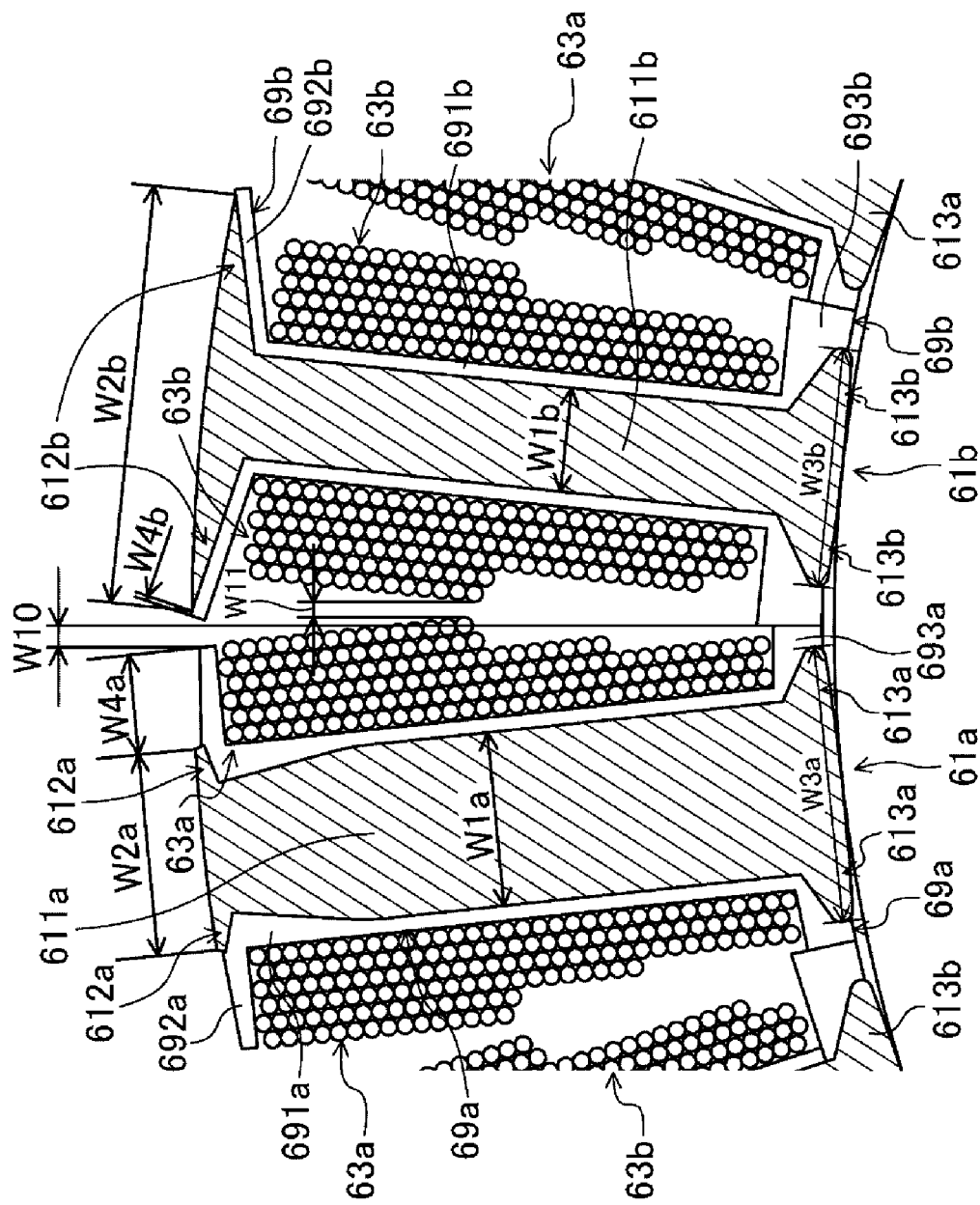

FIG. 21

| ORDINAL NUMBER OF TEETH | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|---|---|---|---|---|---|---|---|---|---|
| FIRST STATOR | LARGE U | - | LARGE V | SMALL U | LARGE W | SMALL V | LARGE U | SMALL W | LARGE V | SMALL U | LARGE W | SMALL V | LARGE U | SMALL W | LARGE V | SMALL U | LARGE W | SMALL V | LARGE U | SMALL W | LARGE V | SMALL U | LARGE W | SMALL V | LARGE U | SMALL W | LARGE V | SMALL | LARGE | SMALL |
| SECOND STATOR | | SMALL W | | | | | | | | | | | | | | | | | | | | | | | | | V | | W | V |
| AFTER COMBINATION | LARGE U | SMALL W | LARGE V | SMALL U | LARGE W | SMALL V | LARGE U | SMALL W | LARGE V | SMALL U | LARGE W | SMALL V | LARGE U | SMALL W | LARGE V | SMALL U | LARGE W | SMALL V | LARGE U | SMALL W | LARGE V | SMALL U | LARGE W | SMALL V | LARGE U | SMALL W | LARGE V | SMALL | LARGE W | SMALL V |

MOTOR

CROSS-REFERENCE TO RELATED APPLICATIONS

This application claims priority under 35 U.S.C. § 119 to Japanese Patent Application No. 2017-243803, filed on Dec. 20, 2017 in the Japan Patent Office and Korean Patent Application No. 2018-0145224, filed on Nov. 22, 2018 in the Korean Intellectual Property Office, the disclosure of which is incorporated herein by reference.

BACKGROUND

1. Field

Embodiments of the present disclosure relate to a motor and a washing machine including the same.

2. Description of the Related Art

International Patent Publication No. 2009/60587 (hereinafter Patent Document 1), discloses a drum type washing machine comprising an outer-rotor type motor configured to rotate a drum wherein alternately arranged magnets have different coercive forces on a steel core of a rotor and varying amounts of magnetic flux of a magnet have a low coercive force.

Also, Japanese Patent Laid-Open Publication No. hei 11-178298 (hereinafter, Patent Document 2), discloses a permanent magnet motor in which teeth having outer circumferential ends (heads of the teeth) having different shapes are alternately arranged in an annular shape.

SUMMARY

However, Patent Document 1 discloses only increasing or decreasing a magnetic flux of rotor magnets. That is, Patent Documents 1 and 2 do not disclose a structural relationship between a magnetization rate and a motor.

Also, Patent Document 1 discloses only a structure using high-priced magnets such as neodymium magnets and aluminum-nickel-cobalt-copper alloy (alnico) magnets.

To address these deficiencies, it is an object to provide an improved motor to stabilize a magnetization state and to increase a magnetization property when an amount of magnetic flux of a magnet of a rotor is changed.

Additional aspects of the present disclosure will be set forth in part in the description which follows and, in part, will be obvious from the description, or may be learned by practice of the present disclosure.

In accordance with one aspect of the present disclosure, a motor includes a stator including a plurality of teeth arranged to be spaced apart in a circumferential direction and a rotor including a plurality of magnets arranged inside or outside the stator and configured to rotate while electromagnetically interacting with the stator. Here, the plurality of teeth include first teeth having a first cross section and second teeth having a second cross section larger than the first cross section. At least one of the plurality of magnets is switched by the second teeth.

The rotor may include an outer rotor disposed outside the stator and an inner rotor disposed inside the stator, and a magnetic polarity of one of the outer rotor and the inner rotor may be switchable.

The inner rotor may include a plurality of rotor cores arranged to be spaced apart in a circumferential direction thereof and a plurality of first magnets arranged between the plurality of rotor cores. The plurality of first magnets may be configured as fixed magnets whose magnetic polarity is not switched.

The outer rotor may include an annular rotor yoke and a plurality of second magnets combined with an inner circumferential surface of the rotor yoke and arranged to be spaced apart along a circumferential direction of the outer rotor. Also, the plurality of second magnets may be configured as switch magnets.

The stator may include a first coil wound on the first teeth and a second coil wound on the second teeth. The number of windings of the second coil may be greater than the number of windings of the first coil.

Each of the first teeth and the second teeth may include a teeth body portion extending in a diameter direction of the stator, an outer step portion extending from an outer end of the teeth body portion toward both sides in the circumferential direction of the stator, and an inner step portion extending from an inner end of the teeth body portion toward both sides in the circumferential direction of the stator.

A width of the outer step portion of the second teeth may be narrower than a width of the outer step portion of the first teeth.

A width of the inner step portion of the second teeth may be wider than a width of the inner step portion of the first teeth.

The first teeth and the second teeth may be alternately arranged along the circumferential direction of the stator.

The stator may include a first stator including a plurality of first teeth and a second stator including a plurality of second teeth. The first stator and the second stator may be combined with each other in an axial direction of the stator so that the plurality of first teeth and the plurality of second teeth are adjacent to each other.

The stator may include a plurality of first coils wound on the plurality of first teeth and a plurality of second coils wound on the plurality of second teeth. The plurality of first coils may be connected by a first connecting line, and the plurality of second coils are connected by a second connecting line.

The first connecting line and the second connecting line may be arranged above or below the inner rotor.

The first connecting line may be disposed outside the second connecting line in a diameter direction of the inner rotor.

A withdrawal line portion of the first connecting line and a withdrawal line portion of the second connecting line may be connected by a connection switch portion configured to switch between the first stator and the second stator.

In the first stator, a first winding space for winding the plurality of first coils may be formed between outer ends of the adjacent first teeth. In the second stator, a second winding space for winding the plurality of second coils may be formed between outer ends of the adjacent second teeth.

The stator may include a first insulator configured to cover the plurality of first teeth to insulate the plurality of first teeth and a second insulator configured to cover the plurality of second teeth to insulate the plurality of second teeth.

Each of the first insulator and the second insulator may include a body portion extending in a diameter direction of the stator, an outer step portion extending from an outer end of the body portion toward both sides in the circumferential direction of the stator, and an inner step portion extending from an inner end of the body portion toward both sides in the circumferential direction of the stator.

A width of the outer step portion of the second insulator may be wider than a width of the outer step portion of the first insulator.

The first insulator may include a groove combined with a fixing chuck for fixing the first teeth during a process of winding a first coil on the first teeth.

The motor may further include a position sensor which detects a rotation position of the rotor. Here, the position sensor may be disposed in a position closer to the first teeth than the second teeth.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

These and/or other aspects of the present disclosure will become apparent and more readily appreciated from the following description of the embodiments, taken in conjunction with the accompanying drawings of which:

FIG. 9 illustrates a view of a corresponding relationship between each phase and first and second stators;

FIG. 16 illustrates a view of a coil winding structure;

FIG. 21 illustrates a view of a corresponding relationship among each phase, the first and second stators, and a state in which the first and second stators are assembled;

DETAILED DESCRIPTION

FIGS. 1 through 33, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the present disclosure will be described on the basis of the drawings. Meanwhile, a following description of exemplary embodiments is merely an example and is not intended to limit the present disclosure and application or use thereof.

Figure 1:
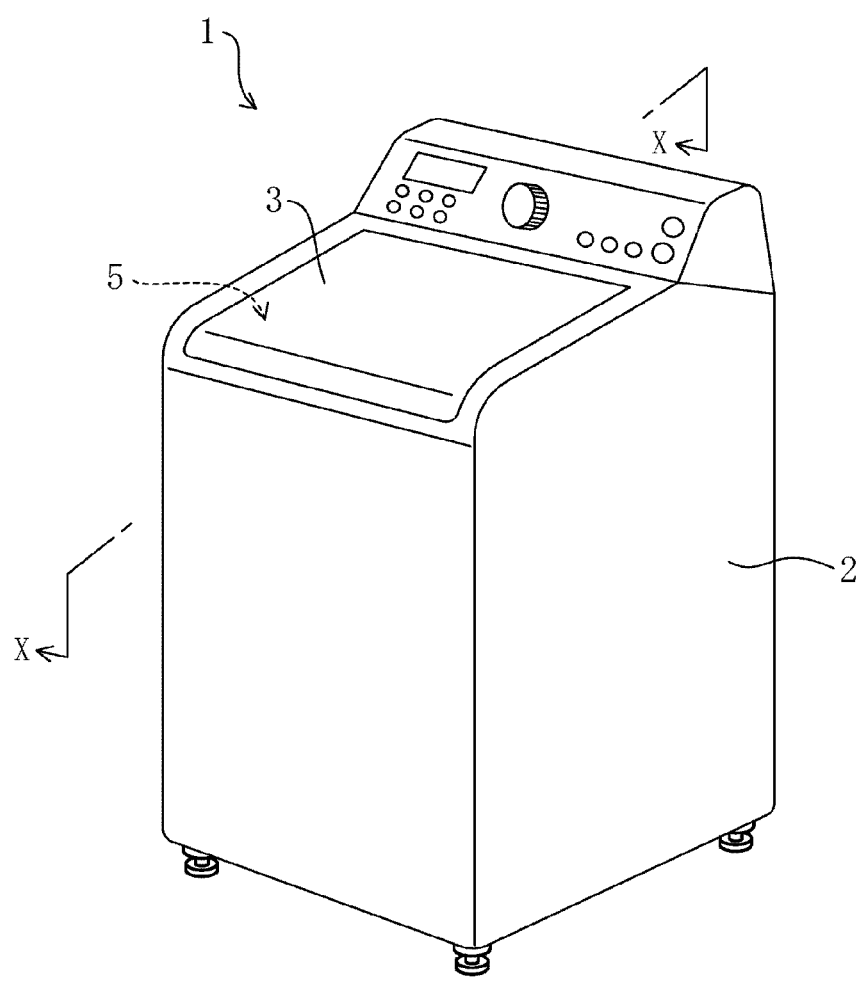
FIG. 1 illustrates a schematic perspective view of a washing machine.

FIG. 1 illustrates a washing machine 1 according to an embodiment. The washing machine 1 exemplifies a fully automatic washing machine capable of performing washing, rinsing, spin-drying operations under the automatic control.

The washing machine 1 includes a case 2 having a vertically lengthwise rectangular shape and an inlet 5 for withdrawing or inserting laundry therein. The inlet 5 is opened or closed by a cover 3.

At the rear of the inlet 5, a variety of switches or a display portion operated by a user is installed.

Figure 2:
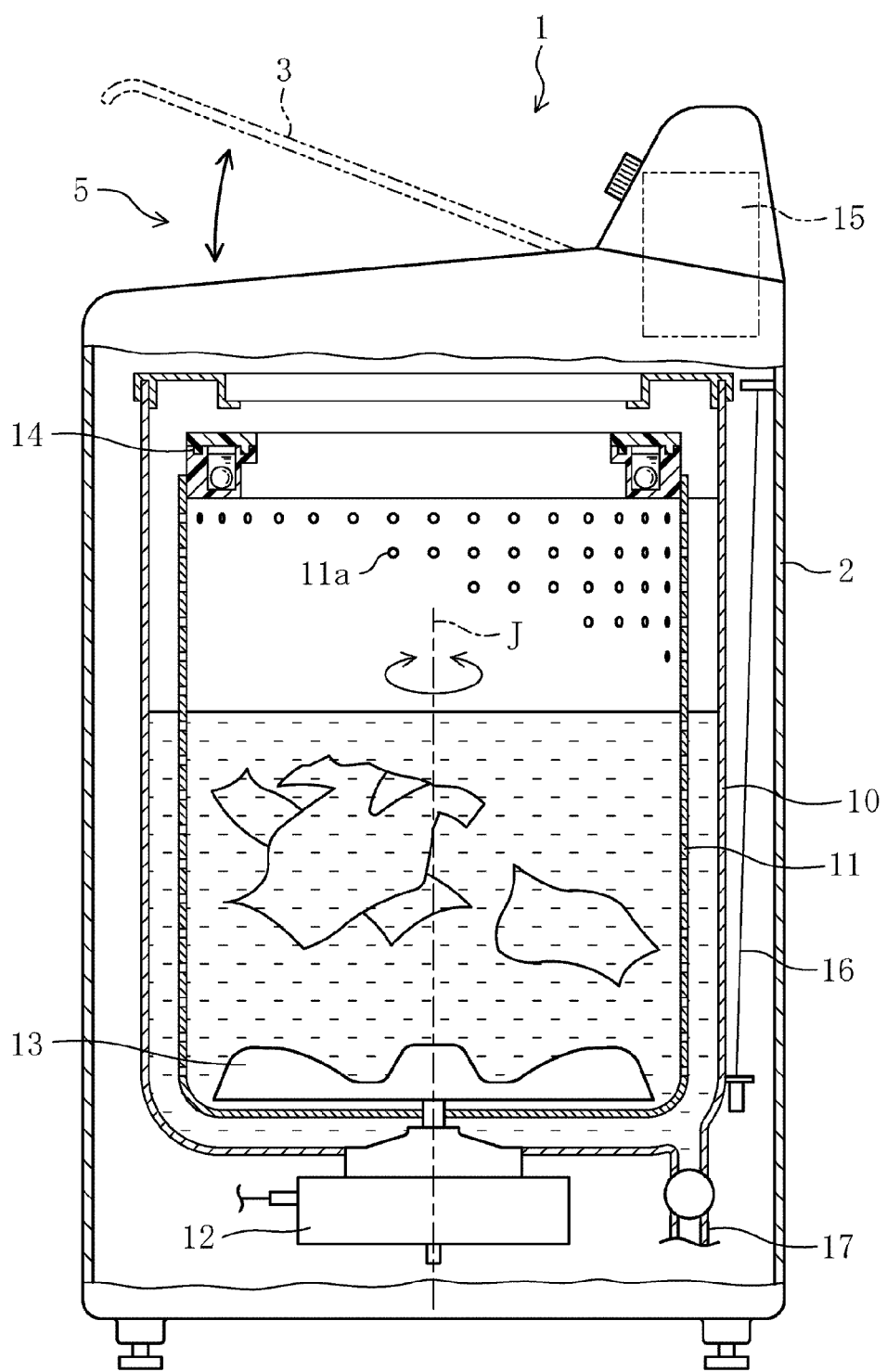
FIG. 2 illustrates a schematic cross-sectional view taken along a line X-X of FIG. 1.

As shown in FIG. 2, in the case 2, a washing tub 10, a spin-drying tub 11, a motor 12, a pulsator 13, a balancer 14, a control device 15, and the like are installed. Particularly, the motor 12 mounted on the washing machine 1 has a compact size and is configured to carry out adequate performance according to each operation of the washing machine 1. The motor 12 will be additionally described in detail.

The washing tub 10 has a cylindrical container a water-storable bottom and is supported by a plurality of suspension members 16 in the case 2 while an opening of the washing tub 10 faces the inlet 5 on top thereof.

The washing machine 1 is configured to supply water to an inside of the washing tub 10 by using a water-supply device (not shown).

A drain 17 controlled by a valve to be opened or closed is connected to the bottom of the washing tub 10 such that unnecessary water is discharged outward from the washing machine 1 through the drain 17.

The spin-drying tub 11 is disposed inside the washing tub 10 and is provided as a cylindrical container having a laundry-receiving bottom.

The spin-drying tub 11, with an opening facing the inlet 5, is accommodated in the washing tub 10 while being rotatable around a vertical axis J which extends in a vertical direction.

The treatment of the laundry is carried out inside the spin-drying tub 11. A plurality of water-draining holes 11a are formed throughout a cylindrically circumferential wall of the spin-drying tub 11 (only some are shown in the drawing).

The balancer 14 is installed at the opening of the spin-drying tub 11. The balancer 14 is an annular member which accommodates a plurality of balls and a viscous fluid and adjusts imbalance of a weight distribution caused by deviation of laundry during rotation of the spin-drying tub 11.

The pulsator 13 having a disc shape with stirring blades on a top surface thereof is rotatably installed at a bottom portion of the spin-drying tub 11.

The control device 15 includes hardware such as a central processing unit (CPU), a read-only memory (ROM), and the like and includes software such as a control program and the like and integrally controls each operation performed by the washing machine 1. The control device 15 further includes at least one processor (not shown).

The control device 15 is electrically connected to the variety of switches, the motor 12, and the like and is configured such that the control program performs a washing, rinsing, or spin-drying operation according to an instruction of the user. For example, in the washing or rinsing operation, the motor 12 rotates and reversely rotates the pulsator 13 at uniform intervals so as to stir laundry with water or a detergent. In the spin-drying operation, the motor 12 is rotated at high speed in a certain direction such that laundry is pressurized on the circumferential wall to be spin-dried due to an action of a centrifugal force.

Figure 3:
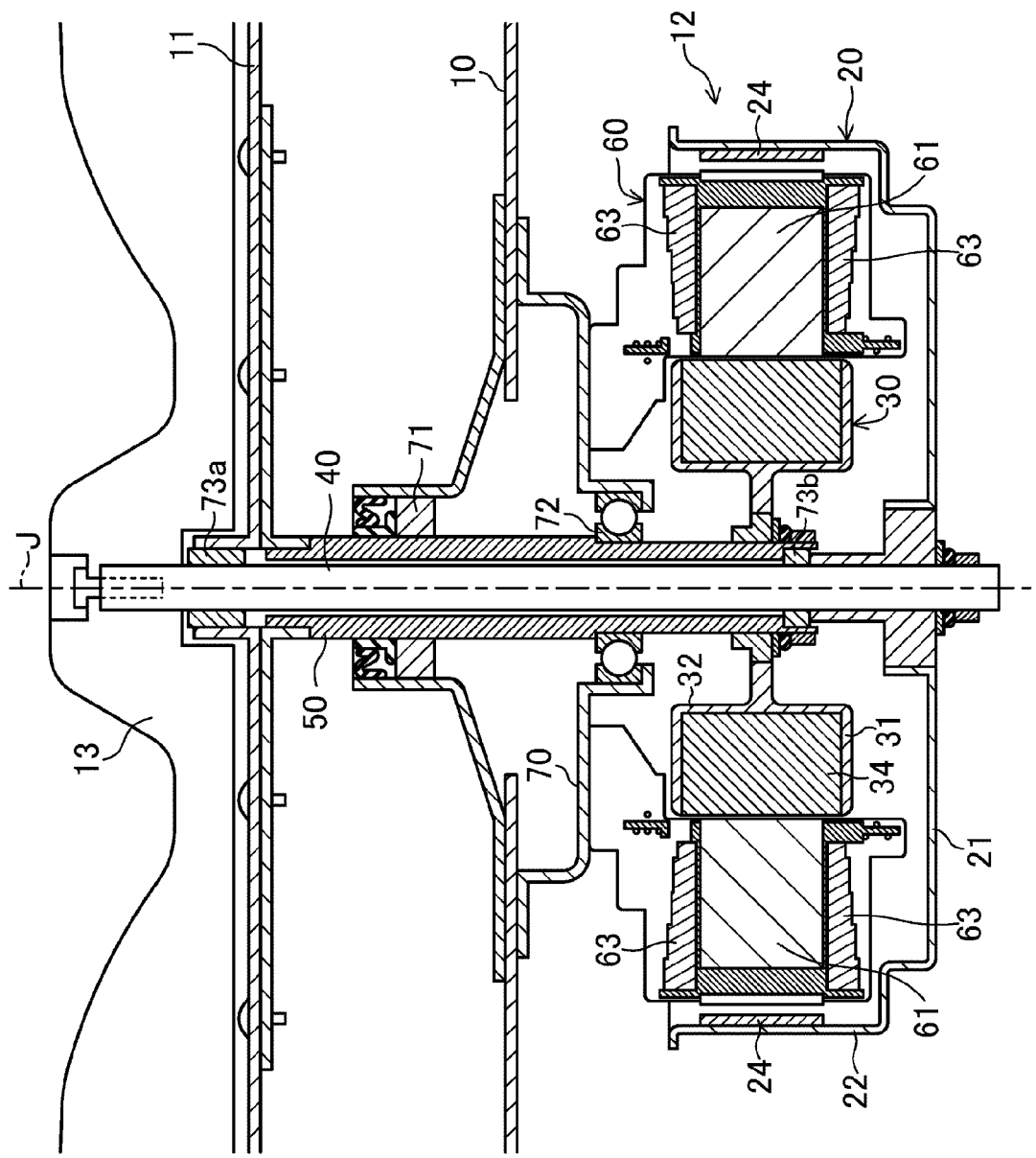
FIG. 3 illustrates a schematic longitudinal cross-sectional view illustrating an assembled structure of a motor.

As shown in FIG. 3, the motor 12 includes an annular stator 60 and an outer rotor 20 and an inner rotor 30 which are separately and independently rotatable with respect to the stator 60.

A detailed example of a configuration of the motor according to the embodiment will be described in detail with reference to "a configuration of a motor" which will be described below.

—Principle of Rotation of Motor (One Stator-Two Rotors)—

A principle of rotation of the motor 12 will be described.

FIGS. 23A to 23F illustrate positions of the stator 60, the outer rotor 20, and the inner rotor 30 within 360 electrical degrees during rotation of a three-phased motor in series of six steps and schematically illustrate a principle of rotation of the outer rotor 20 and the inner rotor 30.

In the embodiment, teeth 61 include first teeth 61a and second teeth 61b (refer to FIG. 5) having different shapes. However, for convenience of description, the teeth 61 will be illustrated and described without distinguishing a difference in shapes of the teeth 61. Likewise, a coil 63 wound on the teeth 61 will be illustrated and described as the coil 63 without distinguishing a first coil 63a (refer to FIG. 5) wound on the first teeth 61a from a second coil 63b (refer to FIG. 5) wound on the second teeth 61b.

In FIGS. 23A to 23F, the outer rotor 20 and the inner rotor 30 equally have forty poles and are illustrated for each mechanical degree thereof which is 18°. When driving currents are applied to the coil 63 having three shapes such as a U shape, a V shape, and a W shape, magnetic poles occur on the teeth 61. The magnetic poles are opposite on the inner rotor 30 and the outer rotor 20 of the teeth 61.

Figure 23A:
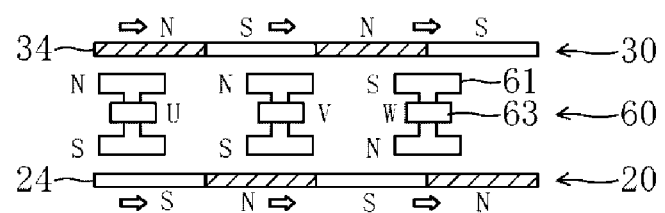
FIGS. 23A to 23F illustrate views of a rotation mode when the number of magnetic poles of the outer rotor is forty.

In a first step shown in FIG. 23A, parts of the U-shaped and V-shaped teeth 61 facing the inner rotor 30 have N pole, and a part of the W-shaped teeth 61 facing the inner rotor 30 has S-pole. Accordingly, parts of the U-shaped and V-shaped teeth 61 facing the outer rotor 20 have S-pole, and a part of the W-shaped teeth 61 facing the outer rotor 20 has N-pole. Hereinafter, only the pole of the part of the teeth 61 facing the inner rotor 30 will be described.

In the first step, the outer rotor 20 and the inner rotor 30 receive a force to rotate in a rightward direction shown in FIG. 23A as torque while having been displaced by 180 electrical degrees.

Figure 23B:
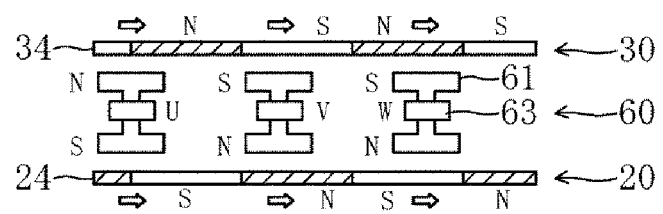

In a second step shown in FIG. 23B, a magnetic pole of the V-shaped teeth 61 is reversed. Accordingly, the polarity of the V-shaped teeth 61 changes to S-pole while the part of the U-shaped teeth 61 facing the inner rotor 30 has N-pole, and the outer rotor 20 and the inner rotor 30 move rightward while the W-shaped teeth 61 has S-pole.

Figure 23C:
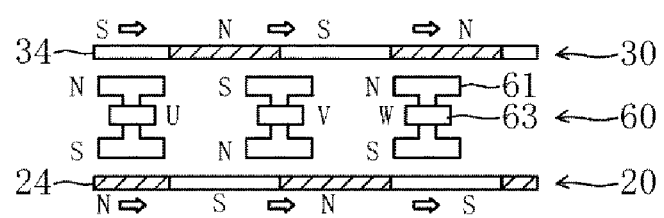

In a third step shown in FIG. 23C, a magnetic pole of the W-shaped teeth 61 is reversed. Accordingly, while the part of the U-shaped teeth 61 facing the inner rotor 30 has N-pole and the V-shaped teeth 61 have S-pole, the W-shaped teeth 61 change to N-pole and the outer rotor 20 and the inner rotor 30 move rightward.

Figure 23D:
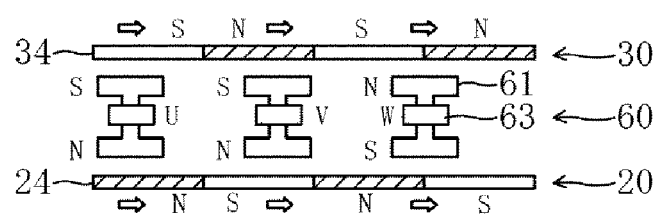

In a fourth step shown in FIG. 23D, a magnetic pole of the U-shaped teeth 61 is reversed. Accordingly, while the part of the U-shaped teeth 61 facing the inner rotor 30 has S-pole, the V-shaped teeth 61 have S-pole, and the W-shaped teeth 61 have N-pole, the outer rotor 20 and the inner rotor 30 move rightward.

Figure 23E:
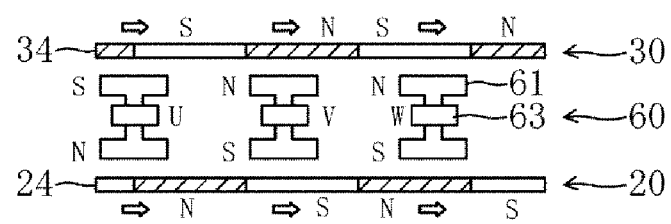

In a fifth step shown in FIG. 23E, a magnetic pole of the V-shaped teeth 61 is reversed. Accordingly, while the U-shaped teeth 61 facing the inner rotor 30 have S-pole, the V-shaped teeth 61 change to N-pole. While the W-shaped teeth 61 have N-pole, the outer rotor 20 and the inner rotor 30 move rightward.

Figure 23F:
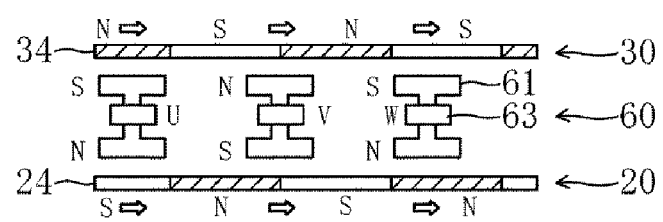

In a sixth step shown in FIG. 23F, a magnetic pole of the W-shaped teeth 61 is reversed. Accordingly, while the part of the U-shaped teeth 61 facing the inner rotor 30 has S-pole and the V-shaped teeth 61 have N-pole, the W-shaped teeth 61 have S-pole and the outer rotor 20 and the inner rotor 30 move rightward.

As described above, the outer rotor 20 and the inner rotor 30 rotate at the same speed in the same direction. In the embodiment, this rotation mode is defined as a synchronized rotation mode. Meanwhile, although phases of the outer rotor 20 and the inner rotor 30 may be slightly displaced by a load or change in the load, it has been described with reference to FIGS. 23A to 23F that there is no displacement in phase.

Next, a rotation mode in which the number of poles of the outer rotor 20 is switched will be described with reference to FIGS. 24A to 24F.

As shown in FIGS. 24A to 24F, the outer rotor 20 has twenty poles and the inner rotor 30 has forty poles. Although an example in which the outer rotor 20 has twenty poles will be described below, the inner rotor 30 may have twenty poles.

Figure 24A:
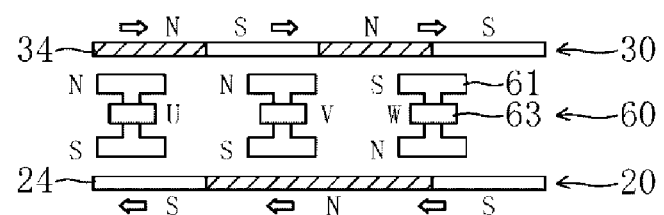
FIGS. 24A to 24F illustrate views of a rotation mode when the number of magnetic poles of the outer rotor is twenty.

In a first step shown in FIG. 24A, parts of the U-shaped and V-shaped teeth 61 facing the inner rotor 30 have N-pole, and a part of the W-shaped teeth 61 facing the inner rotor 30 has S-pole. Accordingly, parts of the U-shaped and V-shaped teeth 61 facing the outer rotor 20 have S-pole, and a part of the W-shaped teeth 61 facing the outer rotor 20 has N-pole.

In the first step, the inner rotor 30 receives a force of rotating in a rightward direction shown in FIG. 24A as torque. The outer rotor 20 receives a force of rotating in a leftward direction shown in FIG. 24A as torque.

Figure 24B:
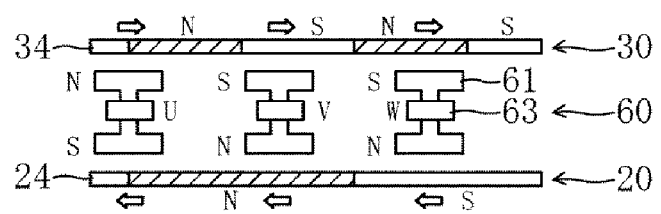

In a second step shown in FIG. 24B, a magnetic pole of the V-shaped teeth 61 is reversed. Accordingly, the V-shaped teeth 61 change to S-pole while the part of the U-shaped teeth 61 facing the inner rotor 30 has N-pole. The inner rotor 30 moves rightward and the outer rotor 20 moves leftward while the W-shaped teeth 61 has S-pole facing the inner rotor 30.

Figure 24C:
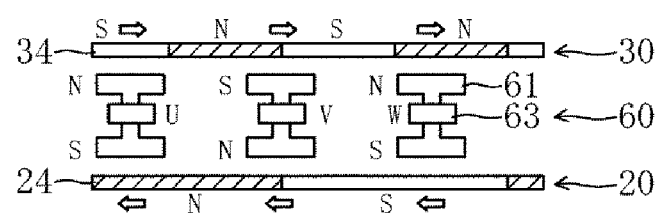

In a third step shown in FIG. 24C, a magnetic pole of the W-shaped teeth 61 is reversed. Accordingly, while the part of the U-shaped teeth 61 facing the inner rotor 30 has N-pole and the V-shaped teeth 61 has S-pole, the W-shaped teeth 61 change to N-pole, the inner rotor 30 moves rightward, and the outer rotor 20 moves leftward.

Figure 24D:
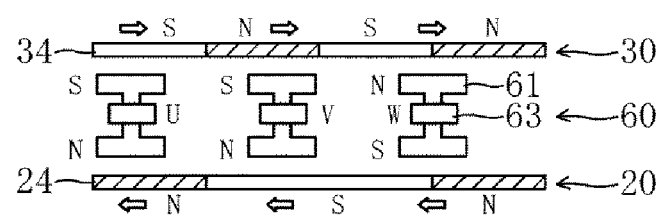

In a fourth step shown in FIG. 24D, a magnetic pole of the U-shaped teeth 61 is reversed. Accordingly, while the part of the U-shaped teeth 61 facing the inner rotor 30 has S-pole, the V-shaped teeth 61 have S-pole, and the W-shaped teeth 61 have N-pole, the inner rotor 30 moves rightward and the outer rotor 20 moves leftward.

Figure 24E:
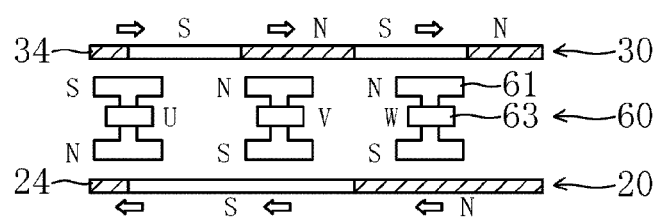

In a fifth step shown in FIG. 24E, a magnetic pole of the V-shaped teeth 61 is reversed. Accordingly, the polarity of the V-shaped teeth 61 changes to N-pole while the part of the U-shaped teeth 61 facing the inner rotor 30 has S-pole. The inner rotor 30 moves rightward and the outer rotor 20 moves leftward while the W-shaped teeth 61 have N-pole facing the inner rotor 30.

Figure 24F:
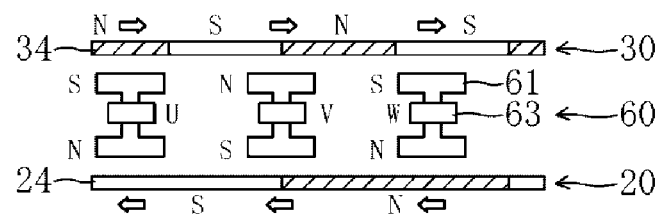

In a sixth step shown in FIG. 24F, a magnetic pole of the W-shaped teeth 61 is reversed. Accordingly, while the part of the U-shaped teeth 61 facing the inner rotor 30 has S-pole and the V-shaped teeth 61 have N-pole, the W-shaped teeth 61 change to S-pole, the inner rotor 30 moves rightward, and the outer rotor 20 moves leftward. Here, movement amount of the outer rotor 20 is twice as much as the inner rotor 30.

As described above, the outer rotor 20 and the inner rotor 30 rotate at different speeds in different directions. In the embodiment, this rotation mode is defined as a contrary rotation mode.

Meanwhile, the rotation modes may include different rotational ratios or the same rotational ratio between the synchronized rotation mode and the contrary rotation mode through combinations of numbers of magnetic poles in addition to the embodiment. As described above, the synchronized rotation mode or the contrary rotation mode may include rotation modes of rotating at a random rotation ratio or rotating at different torques through rotation in the same direction or different directions.

Although a position sensor for applying three-phased currents is not shown in FIGS. 24A to 24F, information on a position relationship among the outer rotor 20, the inner rotor 30, and the stator 60 may be adequately obtained by using, for example, a sensorless method, a position sensor, an encoder, and the like.

Although the principle in which the outer rotor 20 and the inner rotor 30 rotate in the synchronized rotation mode or the contrary rotation mode has been described on the basis of states of the six steps shown in FIGS. 23A to 23F and 24A to 24F in the embodiment, the present disclosure is not limited thereto. For example, it is possible to randomly select a square-wave current-carrying method, a sine wave operation, vector control, and the like.

—Principle of Magnetization—

Next, a principle of magnetization will be described with reference to FIGS. 25 to 32. For convenience of description, the principle will be described without differentiating shapes of the teeth 61.

Also, a surface permanent magnet (SPM) type outer rotor 20 will be described as an example with reference to FIGS. 25 to 32. However, the principle of the magnetization method may be applied equally to a consequent structure which will be described below.

In detail, as shown in FIGS. 25 to 32, forty outer magnets 24 are arranged so as to alternately align S polarities and N polarities along a circumferential direction and are fixed to an inner surface of a rotor yoke 22.

The outer magnet 24 includes a switch magnet 25 and a fixed magnet 35. In detail, among five outer magnets 24 shown in FIG. 25, first, second, and fifth magnets from below are configured as the switch magnets 25. Also, third and fourth magnets from below are configured as fixed magnets 35. That is, two adjacent magnets are configured to have the same function.

The inner rotor 30 is a spoke type rotor, and the forty inner magnets 34 are arranged to be radially aligned at intervals in a circumferential direction and are mounted on and fixed to an inner circumferential wall portion 32. Rotor cores 33 are arranged between the inner magnets 34 in a circumferential direction and are configured such that facing magnets have the same magnetic pole.

Figure 26:
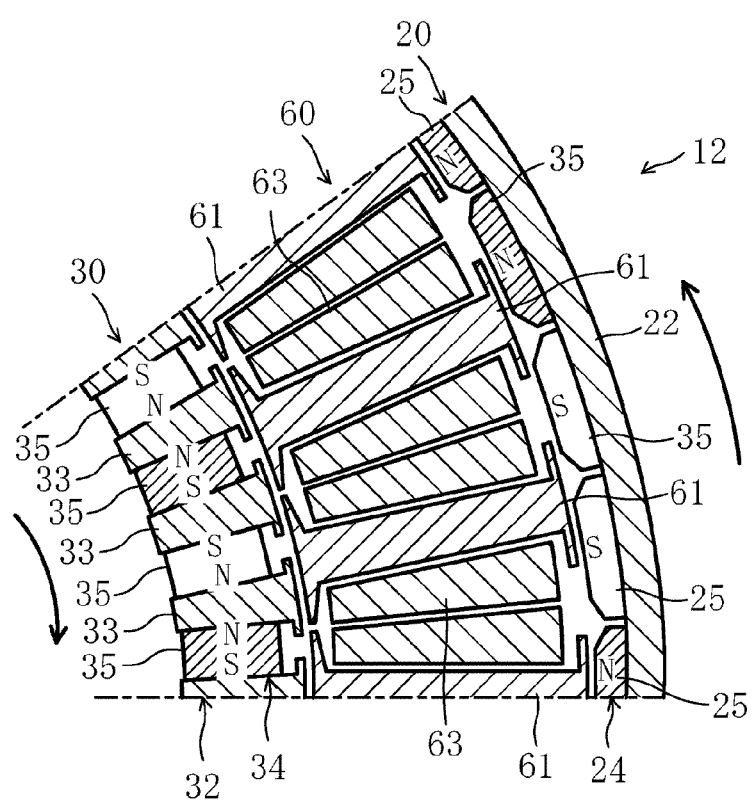

When a magnetization current is supplied to the coil 63 and magnetic poles of all the switch magnets 25 are reversed, as shown in FIG. 26, the first and fifth switch magnets 25 from below are reversed from S-pole to N-pole and the second switch magnet 25 is reversed from N-pole to S-pole. As described above, conversion is performed to alternately arrange a set of two adjacent S-pole magnets and a set of two adjacent N-pole magnets in a circumferential direction such that the number of magnet poles of the outer rotor 20 is twenty.

Figure 25:
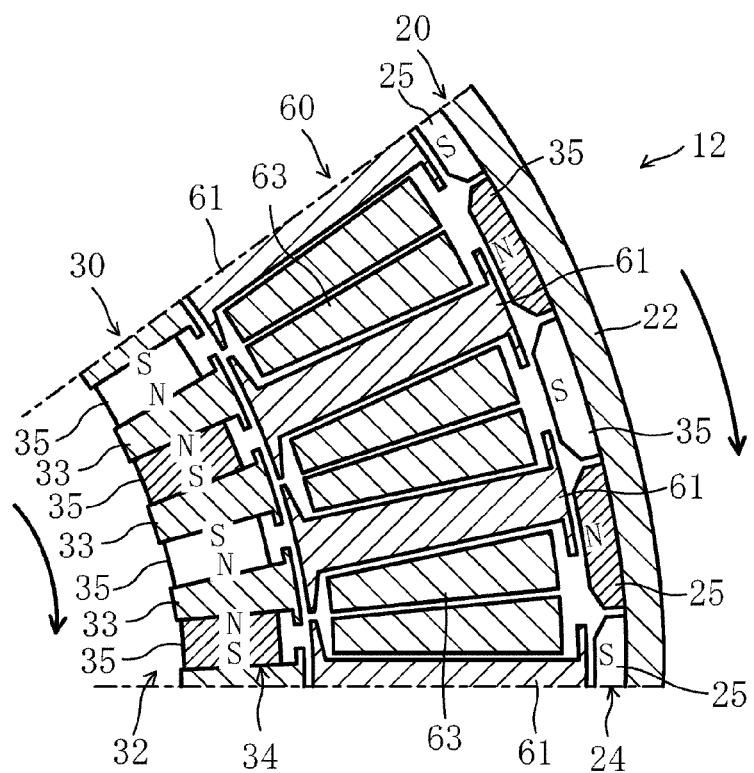
FIGS. 25 and 26 illustrate views of a principle of a magnetization method.

When the number of magnet poles of the outer rotor 20 is forty and a driving current is supplied to the coil 63, as an arrow shows in FIG. 25, both the outer rotor 20 and the inner rotor 30 rotate clockwise. That is, the outer rotor 20 and the inner rotor 30 may be rotated in the synchronized rotation mode.

When the number of magnet poles of the outer rotor 20 is twenty and a driving current is supplied to the coil 63, as an arrow shows in FIG. 26, the outer rotor 20 rotates counterclockwise and the inner rotor 30 rotates clockwise. That is, the outer rotor 20 and the inner rotor 30 may be rotated in the contrary rotation mode.

The numbers of the inner magnets 34 and the outer magnets 24 are merely examples, and the present disclosure is not limited thereto.

Hereinafter, a sequence of magnetizing the switch magnet 25 a plurality of times will be described with reference to FIGS. 27 to 32.

Hereinafter, a case of changing the number of magnetic poles of the outer rotor 20 from forty to twenty will be described. Since it is possible to perform a case of changing the number of magnetic poles of the outer rotor 20 from twenty to forty by performing a following magnetization sequence in reverse, a description thereof will be omitted.

Figure 27:
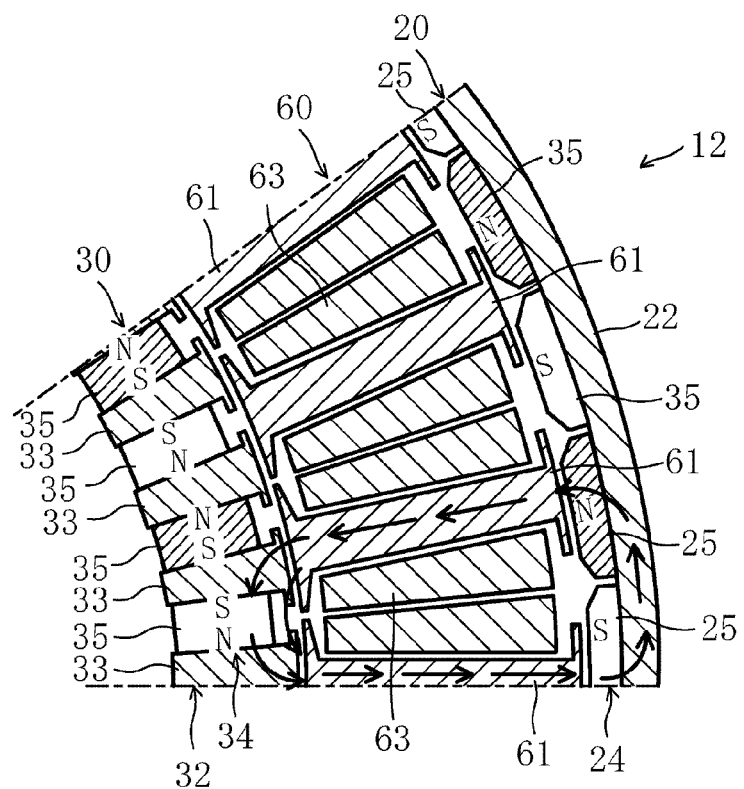
FIGS. 27 to 32 illustrate plan cross-sectional views of a sequence of performing a plurality of divided magnetization operations.

As shown in FIG. 27, a position of the outer rotor 20 is determined. In detail, a current is applied to the coil 63 to allow a magnetic field to flow through the first U-shaped teeth 61 and the second W-shaped teeth 61 in a direction an arrow shows in FIG. 27. Herein, currents of about 5 A are applied so as to generate a magnetic field to fix the outer rotor 20 to a position shown in FIG. 27. Accordingly, magnetic poles of the outer rotor 20 and the inner rotor 30 which face the teeth 61 maintain balance and stop at the position shown in FIG. 27.

Figure 28:
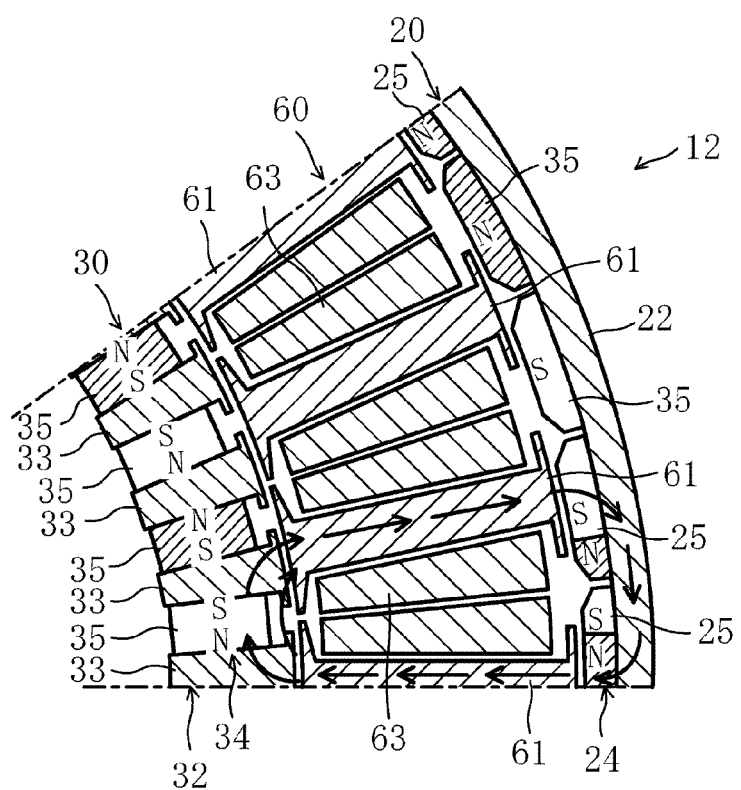

Next, as shown in FIG. 28, a magnetization current is applied to the coil 63 so as to apply a magnetic field from the position where the outer rotor 20 stops to the first teeth 61 and the second teeth 61 from below in a direction shown as an arrow in FIG. 28. For example, currents are approximately 30 A higher than when the position of the outer rotor 20 are applied for magnetization. Accordingly, the first and second switch magnets 25 are partially magnetically attached to opposite magnetic poles from below as shown in FIG. 28.

Figure 29:
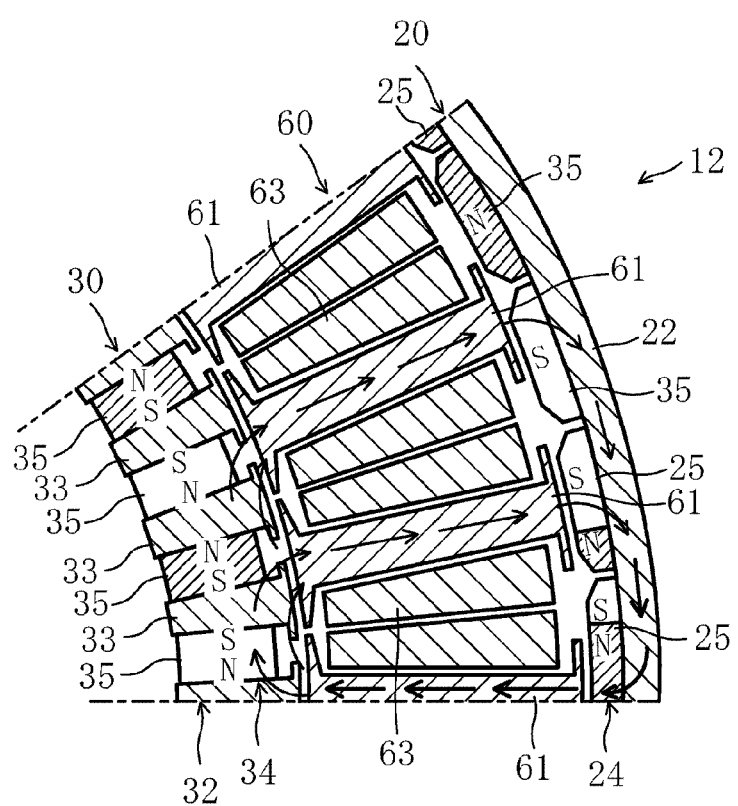

Next, as shown in FIG. 29, a current is applied to the coil 63 such that a magnetic field is applied to the first U-shaped, second W-shaped, and third V-shaped teeth 61 from below in a direction shown as an arrow in FIG. 29. Herein, currents of about 5 A are applied so as to generate a magnetic field to fix the outer rotor 20 to a position shown in FIG. 29. Accordingly, magnetic poles of the outer rotor 20 and the inner rotor 30 maintain balance and the rotors are stopped at the position shown in FIG. 29.

Figure 30:
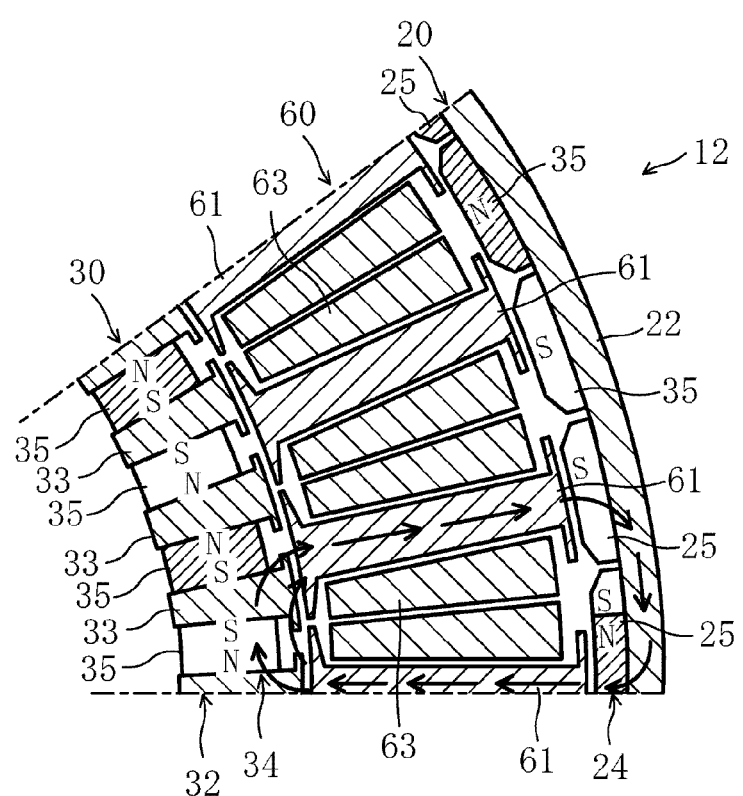

Next, as shown in FIG. 30, a magnetization current is applied to the coil 63 so as to apply a magnetic field from the position where the outer rotor 20 stops the first teeth 61 and the second teeth 61 from below in a direction shown as an arrow in FIG. 30. For example, currents are approximately 30 A higher than when the position of the outer rotor 20 are applied for magnetization. Here, since a portion of the second switch magnet 25 which faces the teeth 61 from below increases, a reversal of a magnetic pole from N-pole to S-pole is completed.

Figure 31:
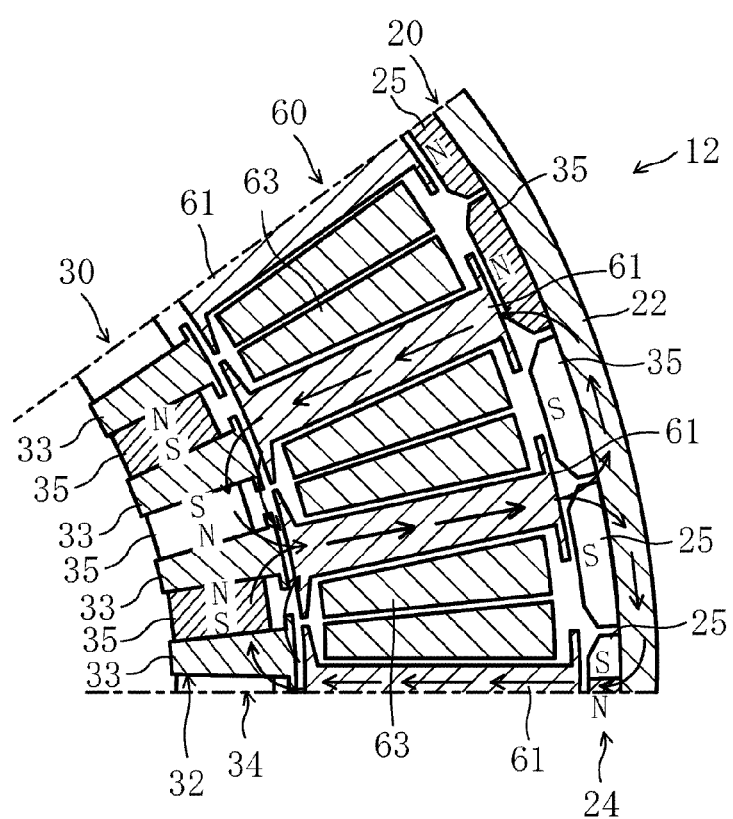

Next, as shown in FIG. 31, a current is applied to the coil 63 such that a magnetic field is applied to the first, second, and third teeth 61 from below in a direction shown as an arrow in FIG. 31. Herein, currents of about 5 A are applied so as to generate a magnetic field to fix the outer rotor 20 to a position shown in FIG. 31. Accordingly, magnetic poles of the outer rotor 20 and the inner rotor 30 which face the teeth 61 maintain balance and the rotors stop at the position shown in FIG. 31.

Figure 32:
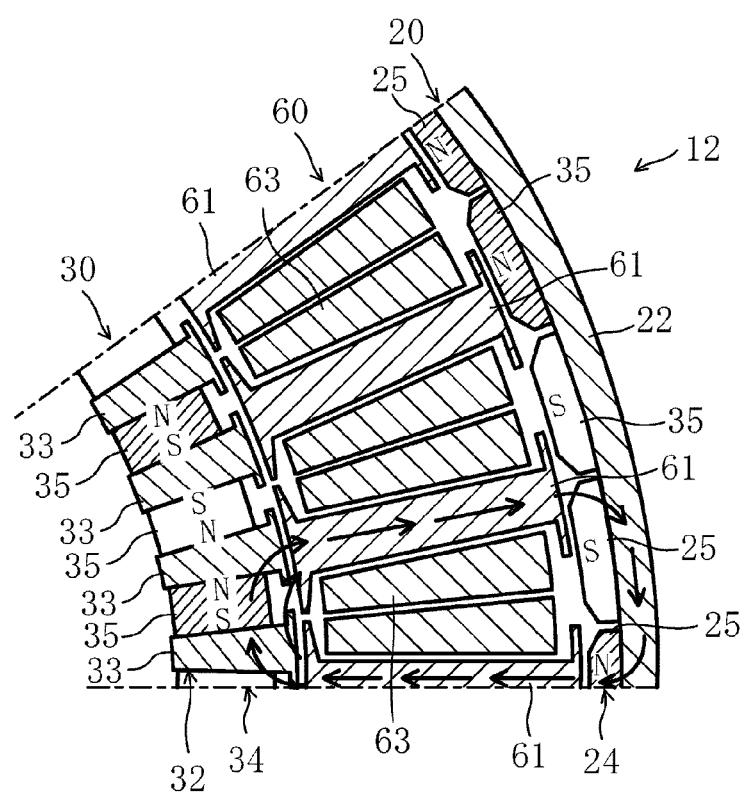

Next, as shown in FIG. 32, a magnetization current is applied to the coil 63 so as to apply a magnetic field from the position where the outer rotor 20 stops to the first teeth 61 and the second teeth 61 from below in a direction shown as an arrow in FIG. 32. For example, currents are approximately 30 A higher than when the position of the outer rotor 20 are applied for magnetization. Here, since a portion of the first switch magnet 25 which faces the teeth 61 from below increases, a reversal of a magnetic pole from S-pole to N-pole is completed.

A magnetization operation is performed while rotation of the outer rotor 20 stops in the embodiment, for example, the magnetization operation may be performed during low-speed rotation. In this case, while the rotation of the outer rotor 20 stops before starting the magnetization operation, the magnetization operation may be performed at least one time and then the magnetization operation may be performed for a remaining number of times while a relative position with the teeth 61 is changed by rotating the outer rotor 20 at low speed.

That is, it is possible to apply magnetization currents when the outer rotor 20 low-speed rotation is disposed at the position in FIG. 27 and the like. In this case, the magnetization operation may be performed during the synchronized rotation mode. Even in the contrary rotation mode, it is possible to perform the magnetization operation by recognizing a position of the switch magnet 25 by using a position sensor (not shown) and the like.

In order to determine the position of the outer rotor 20, a sensorless position signal may be used or a position signal of the inner magnet 34 of the inner rotor 30 which is obtained by a position sensor (not shown) may be used. Also, a position signal for position signal treatment such as equalization of the inner rotor 30 and the outer rotor 20 may be used.

When the outer rotor 20 rotates at low speed, an inertia moment effect during rotation of the outer rotor 20 in comparison with a stop state may be used and a position of magnetization may be more precisely determined by using the position signal. Accordingly, it is possible to precisely and easily switch a magnetic pole. Also, if all magnetization processes are performed during rotation when a change in rotation is recognized by controlling rotation, the inertial moment effect may be used.

Although only first magnetization in the stop state has been described, it is possible to switch a magnetic pole by magnetically attaching first and second times in the stop state for remaining times during rotation.

Also, all magnetization may be performed during rotation. During rotation, a method of performing magnetization is like the above description and a detailed description will be omitted herein.

Also, the number of magnetization is not limited thereto, and magnetization of switching a magnetic pole may be further performed and repeatedly magnetized to further increase precision. Here, since an operation time according to magnetization may be generally performed for one instance of 10 msec, marketability is not deteriorated even when magnetization is repeatedly performed.

—Configuration of Motor—

Next, a configuration of the motor 12 will be described in detail with reference to FIG. 3.

The motor 12 is installed below the washing tub 10.

The motor 12 includes the outer rotor 20, the inner rotor 30, an inner shaft 40, an outer shaft 50, the stator 60, and the like. The motor 12 is provided as a dual rotor motor including the outer rotor 20 and the inner rotor 30 on an outside and an inside in a diameter direction of one stator 60.

The outer rotor 20 and the inner rotor 30 are connected to the pulsator 13 or the spin-drying tub 11 and are configured to directly drive the pulsator 13 or the spin-drying tub 11.

The outer rotor 20 and the inner rotor 30 share the coil 63 of the stator 60 and are configured to independently rotate each of the outer rotor 20 and the inner rotor 30 by supplying a current to the coil 63.

The stator 60 is mounted on a bearing bracket 70 installed at a bottom surface of the washing tub 10.

The outer rotor 20 is provided as a cylindrical member including a flat bottom and includes a bottom wall portion 21 with a through hole passing through a central portion thereof, the rotor yoke 22 standing on a main circumferential portion of the bottom wall portion 21 and a plurality of such outer magnets 24 formed of permanent magnets having a circular arc shape. The bottom wall portion 21 and the rotor yoke 22 are formed by pressing a steel plate to function as a back yoke.

In the embodiment, the outer rotor 20 is provided as a consequent type rotor, and twenty outer magnets 24 are arranged to align S polarities at intervals in a circumferential direction and are fixed to the inner surface of the rotor yoke 22. As described above, magnetic poles of the outer magnets 24 are reversed so as to switch the number of magnetic poles of the outer rotor 20 between twenty poles and forty poles.

The inner rotor 30 is provided as a cylindrical member including a flat bottom whose outer diameter is smaller than that of the outer rotor 20 and includes an inner bottom wall portion 31 having a space in a central portion, the inner circumferential wall portion 32 standing around the inner bottom wall portion 31, and a plurality of such inner magnets 34 formed as permanent magnets having a rectangular plate shape.

In the embodiment, the inner rotor 30 is provided as a spoke type rotor and the forty inner magnets 34 are arranged to be radially aligned at intervals in a circumferential direction and are mounted on and fixed to the inner circumferential wall portion 32. The rotor cores 33 are arranged between the inner magnets 34 in a circumferential direction and are configured such that facing magnets have the same magnetic pole.

Although a structure including a spoke type inner rotor 30 and a consequent outer rotor 20 has been described in the embodiment, the structure is not limited thereto and may be configured by combining an SPM type, an interior permanent magnet (IPM) type, and the like with each other.

The inner shaft 40 is a cylindrical shaft member and is supported by the bearing bracket 70 to be freely rotatable through an upper inner bearing 73a, the outer shaft 50, ball bearings 71 and 72, and a lower inner bearing 73b. A bottom end of the inner shaft 40 is connected to the outer rotor 20. A top end of the inner shaft 40 is connected to the pulsator 13.

The outer shaft 50 is provided to be shorter than the inner shaft 40, is a cylindrical shaft member having a greater inner diameter than an outer diameter of the inner shaft 40, and is supported by the bearing bracket 70 to be freely rotatable through the upper and lower inner bearings 73a and 73b, the inner shaft 40, and the ball bearings 71 and 72. A bottom end of the outer shaft 50 is connected to the inner rotor 30. A top end of the outer shaft 50 is connected to the spin-drying tub 11.

The stator 60 is formed as an annular member having an outer diameter smaller than the inner diameter of the outer rotor 20 and having an inner diameter greater than the outer diameter of the inner rotor 30. The stator 60 is provided while the plurality of teeth 48a, the coil 63, and the like are embedded in a resin. In the stator 60 according to the embodiment, 30 I-shaped teeth 61 and the coil 63 are installed.

The teeth 61 include the coil 63 formed by continuously winding three windings coated with an insulating material in a certain sequence and configuration.

The I-grouped teeth 61 with the coil 63 are embedded in a thermosetting resin through molding and fixed in a certain arrangement in an insulated state while only each cross section along a diameter is exposed.

When the above-described motor 12 is assembled in a washing machine, in consideration of productivity and service properties, the stator 60 may be mounted on a tab first, the inner rotor 30 may be inserted and mounted, and then the outer rotor 20 may be mounted. That is, since the stator 60 may be mounted while the outer rotor 20 and the inner rotor 30 having magnets are not present, it is easy to determine a position thereof when assembled.

The stator 60, the inner rotor 30, and the outer rotor 20 are assembled such that ends of the teeth 61 facing the inner rotor 30 face the rotor cores 33 at a certain distance and ends of the teeth 61 facing the outer rotor 20 face the outer magnets 24 at a certain distance.

A position sensor (not shown) for detecting a position of the inner rotor 30 is disposed near the second teeth 61.

Figure 4:
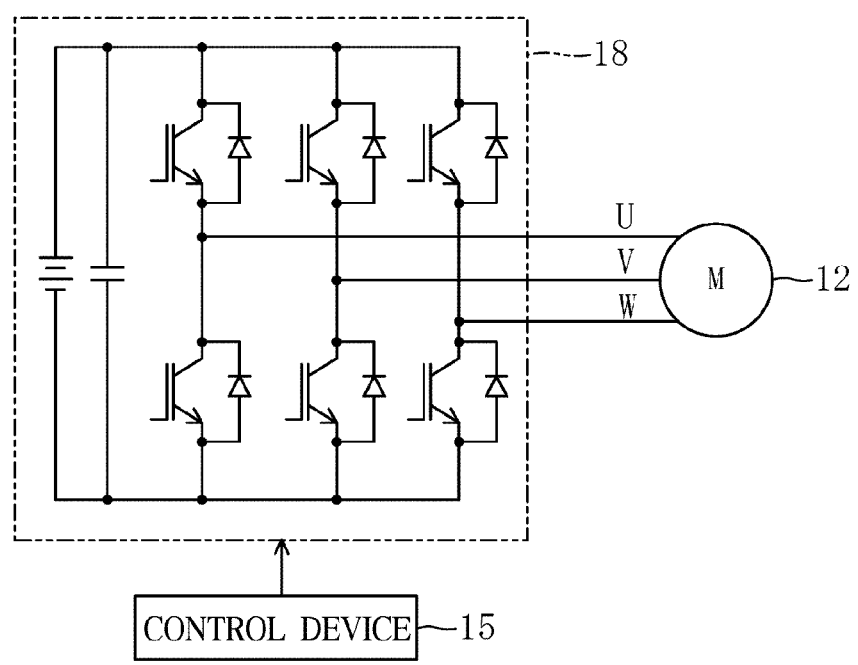
FIG. 4 illustrates a circuit diagram illustrating a configuration of an inverter.

As shown in FIG. 4, a three-phased inverter 18 is connected to the motor 12. In the motor 12, when an electric current is applied to the coil 63 of the stator 60, different poles are generated and an outer side and an inner side of the teeth 61 simultaneously and the outer rotor 20 and the inner rotor 30 are independently rotated according to a rotating magnetic field.

As described above, the outer rotor 20 and the inner rotor 30 share the stator 60 such that the outer rotor 20 and the inner rotor 30 may be driven in a plurality of rotation modes by one inverter 18.

—Configuration of Teeth—

Figure 5:
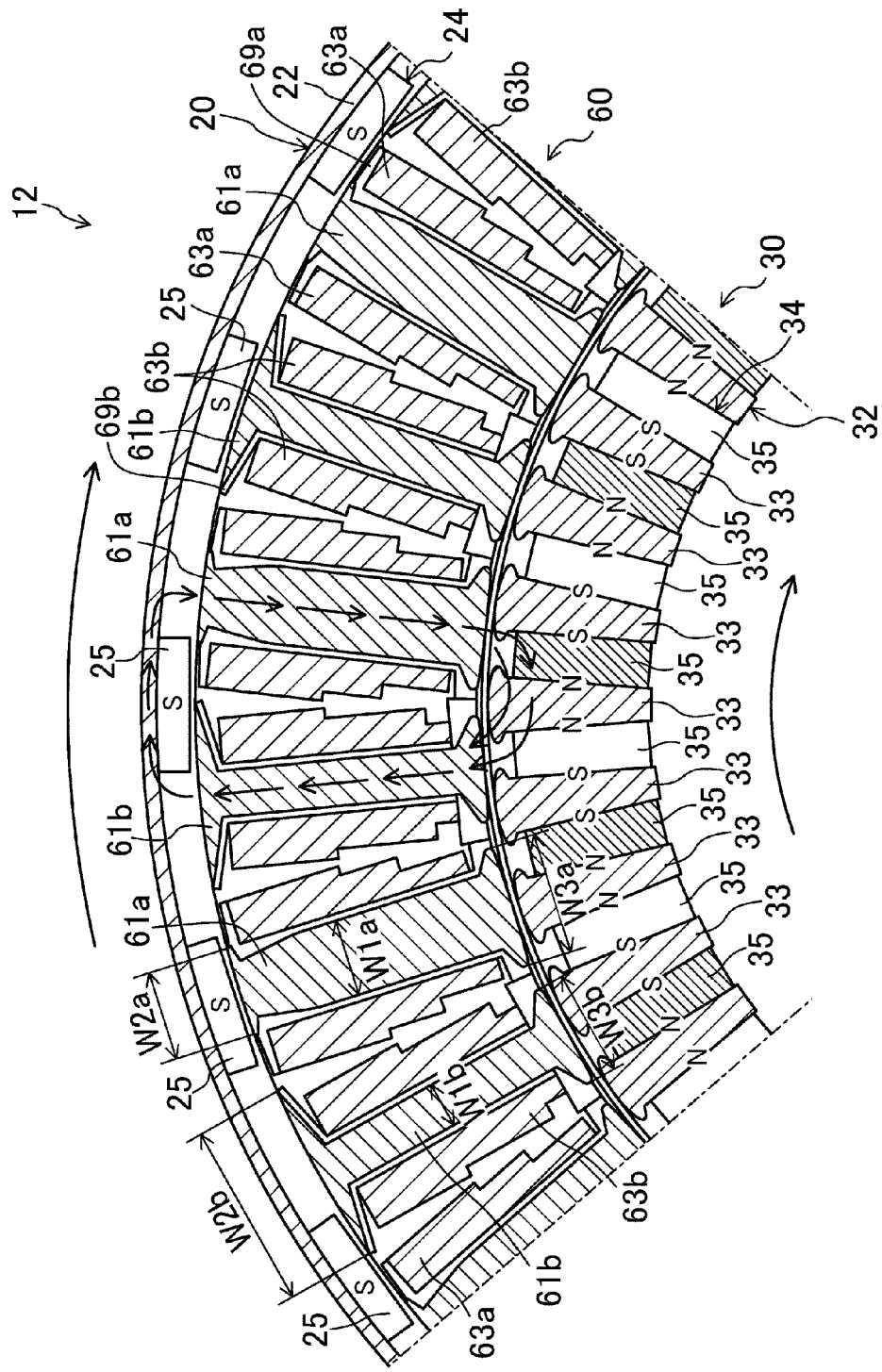
FIG. 5 illustrates a top cross-sectional view of a configuration of the motor that illustrates a state in which the number of magnetic poles of an outer rotor is forty.

Next, a configuration of the teeth 61 will be described. FIG. 5 is a top cross-sectional view illustrating a main portion of the motor and illustrating a state of eighty-one mechanical degrees.

As shown in FIG. 5, the teeth 61 include more than two types of teeth having different shapes. In the embodiment, an example in which the teeth 61 include two types of teeth having different shapes (the first teeth 61a and the second teeth 61b) is shown.

Also, the first teeth 61a and the second teeth 61b are alternately arranged and are arranged on an overall circumference of the stator 60 while being radially aligned to be equidistant.

The coils 63 are wound on the first teeth 61a and the second teeth 61b through insulators 69a and 69b, respectively.

In a following description, when it is unnecessary to distinguish the first teeth 61a and the second teeth 61b, for example, describing a common part of the both parts and the like, they will be simply referred to as the teeth 61. Likewise, with respect to components of the first teeth 61a and the second teeth 61b, for example, the common part will be described with reference numerals or symbols which colligate both parts excluding a and b. With respect to the insulators 69a and 69b, a description on a part which is unnecessary to describe both parts separately, for example, a common part and the like, the insulators 69 will be described while integrating both parts.

The teeth 61: 61a and 61b are steel members formed by overlapping and stacking steel plates having an I-shaped longitudinal cross section.

In detail, as shown in FIG. 16, the teeth 61: 61a or 61b include a teeth body portion 611: 611a or 611b, an outer step portion 612: 612a or 612b which protrudes in a step shape from both corners of an end portion of the teeth body portion 611 facing the outer rotor 20 in a circumferential direction (hereinafter, simply referred to as an outer end portion), and an inner step portion 613: 613a or 613b which protrudes in a step shape from an end portion of the teeth body portion 611 facing the inner rotor 30 in a circumferential direction (hereinafter, simply referred to as an inner end portion).

Windings which form the coils 63: 63a or 63b are wound on the teeth body portion 611: 611a or 611b through the insulator 69: 69a or 69b.

The windings of the coils 63, 63a, and 63b have three phases and are wound such that U-shaped, V-shaped, and W-shaped windings are alternately arranged along a circumferential direction of the coils 63. As a winding method, for example, nozzle winding or flyer winding are available. A detailed configuration or winding method will be described in "Configuration of Bipartitional Stator" which will be described below.

As shown in FIG. 16, the insulator 69: 69a or 69b includes a body portion 691: 691a or 691b on which the coil 63: 63a or 63b is wound, an outer step portion 692: 692a or 692b which protrudes in a step shape from both corners of an outer end portion of the body portion 691 in a circumferential direction, and an inner step portion 693: 693a or 693b which protrudes in a step shape from both corners of an inner end portion of the body portion 691 in a circumferential direction.

The first teeth 61a and the second teeth 61b are formed such that widths of the teeth body portion 611a or 611b, the outer step portion 612a or 612b, and the inner step portion 613a or 613b are different on the basis of a longitudinal cross section.

In detail, on the basis of the longitudinal cross section, the width of the teeth body portion 611a of the first teeth 61a (hereinafter, referred to as a first body width W1a) is greater than the width of the teeth body portion 611b of the second teeth 61b (hereinafter, referred to as a second body width W1b). Also, the width of the outer step portion 612a of the first teeth 61a (hereinafter, referred to as a first outer step width W2a) is smaller than the width of the outer step portion 612b of the second teeth 61b (hereinafter, referred to as a second outer step width W2b). Also, the width of the inner step portion 613a of the first teeth 61a (hereinafter, referred to as a first inner step width W3a) is greater than the width of the inner step portion 613b of the second teeth 61b (hereinafter, referred to as a second inner step width W3b).

FIG. 9 illustrates an arrangement relationship between each of a U shape, a V shape, and a W shape and corresponding teeth 61 (the first teeth 61a and the second teeth 61b). In FIG. 9, the first teeth 61a are referred to as "large" and the second teeth 61b is referred to as "small."

As shown in FIG. 9, the U shape, V shape, and W shape are arranged while having the same numbers of the first teeth 61a and the second teeth 61b.

—Switching of Number of Magnetic Poles—

Next, switching of a number of magnetic poles will be described.

In FIG. 5, all the outer magnets 24 are configured as switch magnets 25. All the inner magnets 34 are configured as the fixed magnets 35. The switch magnets 25 are magnets whose polarity is reversed when magnetization currents are supplied to the coil 63. The fixed magnets 35 are magnets whose polarity is not reversed even when a magnetization current is supplied to the coil 63. It is unnecessary to depend on a magnitude of a coercive force, a type of magnet, or the like which will be described below.

Here, "reversed" and "non-reversed" refer to a polarity of an overall magnet and are distinguished by a total magnetic flux even when an opposite pole is present in a part.

In the embodiment, the number St of magnetic poles of the stator 60 is thirty, the number m of magnetic poles of the inner rotor 30 is forty, the maximum number m of magnetic poles of the outer rotor 20, and a ratio thereof is St:m=3:4 (Condition 1).

Also, the number of magnetic poles may be decreased when Condition 1 is satisfied, and adjacent magnets have the same pole, and the number of magnetic poles may be maximized when adjacent magnetic poles are different poles throughout (Condition 2).

Here, the outer rotor 20 is provided to switch the number of magnetic poles into forty or twenty by switching the number of poles through magnetization.

In detail, in a state shown in FIG. 5, the outer magnets 24 are arranged at intervals in a circumferential direction such that surfaces of the outer magnets 24 facing the teeth 61 change to S polarities. The outer magnets 24 are arranged as described above such that the rotor yoke 22 disposed between the adjacent outer magnets 24 having S-pole changes to N-pole and the number of magnetic poles of the outer rotor 20 becomes forty.

Since a part of N-pole of the rotor yoke 22 does not have a salient pole structure, magnetic resistance between the rotor yoke 22 and the teeth 61 is approximately equal. Vibration or noise may be suppressed by using a consequent type rotor without the above-described salient pole structure.

Figure 6:
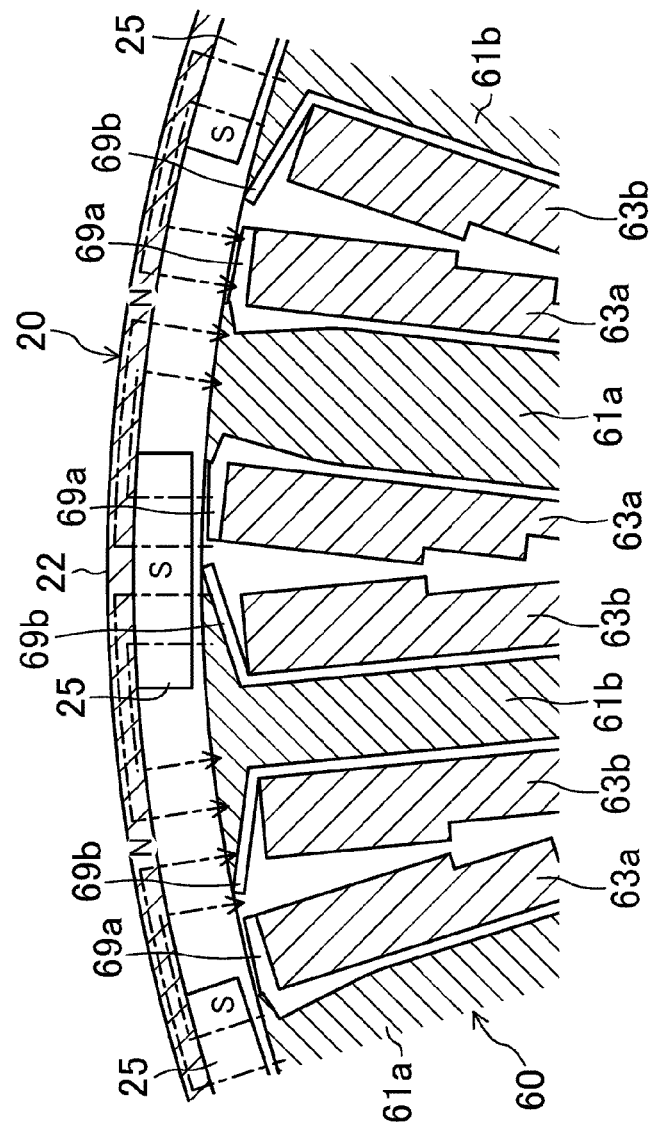
FIG. 6 illustrates a top cross-sectional view of a movement path of a magnetic flux.

As shown in FIG. 6, a magnetic flux out of a part of N-pole of the rotor yoke 22 passes through the inner rotor 30 through the teeth 61, enters S-pole of the outer magnets 24 through other teeth 61, passes through the rotor yoke 22, and returns to N-pole of the rotor yoke 22.

When the number of magnetic poles of the outer rotor 20 is forty, an air gap which is a gap between the rotor yoke 22 having N-pole of the outer rotor 20 and the teeth 61 is great, and an induced voltage is decreased. Accordingly, in spin-drying in which high speed and low torque are necessary, the magnetic poles of the outer rotor 20 may be forty.

Figure 7:
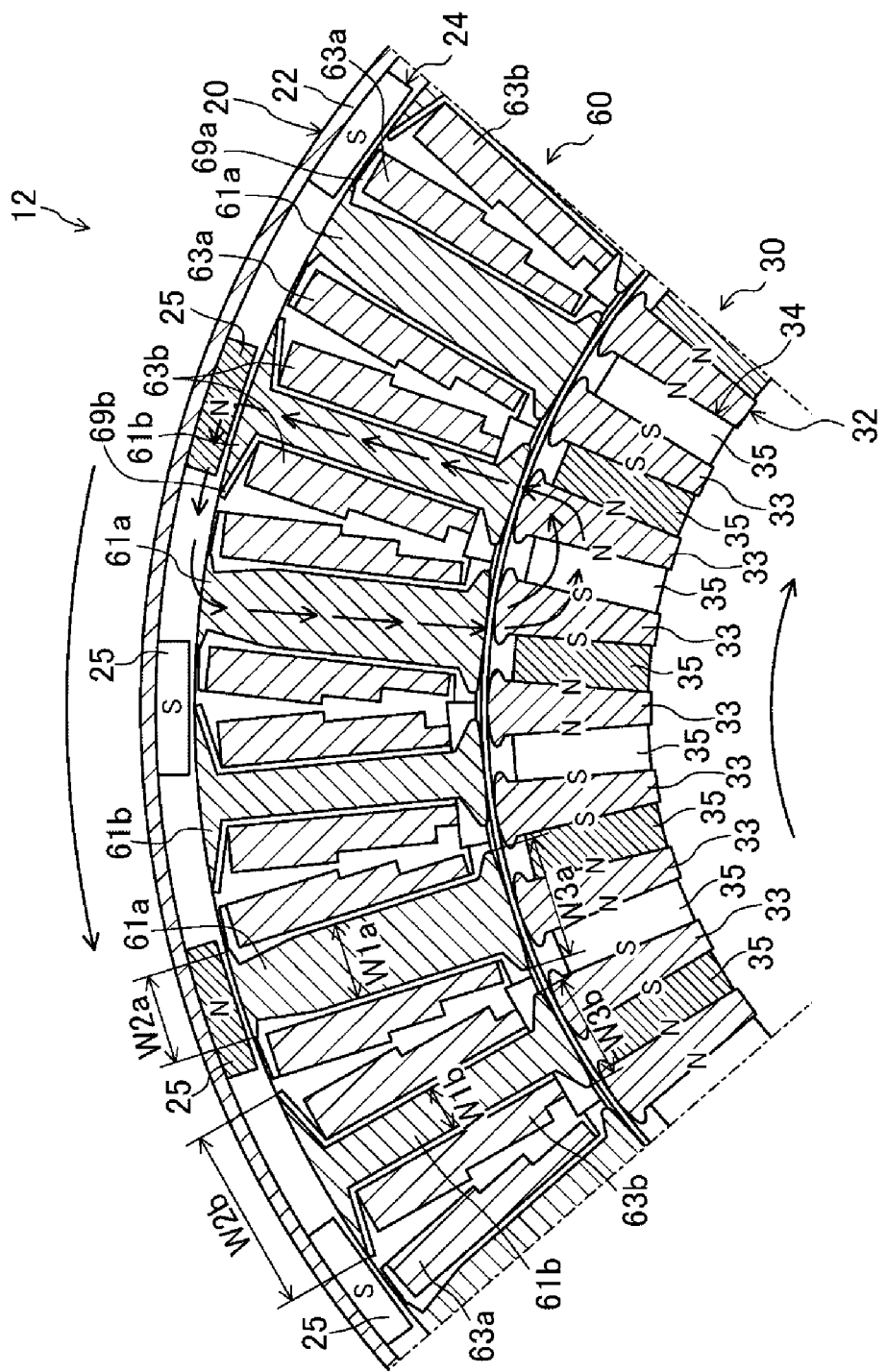
FIG. 7 illustrates a top cross-sectional view of a configuration of the motor that illustrates a state in which the number of magnetic poles of an outer rotor is twenty.

When some of the outer magnets 24 are reversed and switched to alternately align N-pole and S-pole at intervals in a circumferential direction by supplying a magnetization current to the coil 63 as shown in FIG. 7, the number of magnetic poles of the outer rotor 20 changes to twenty.

Figure 8:
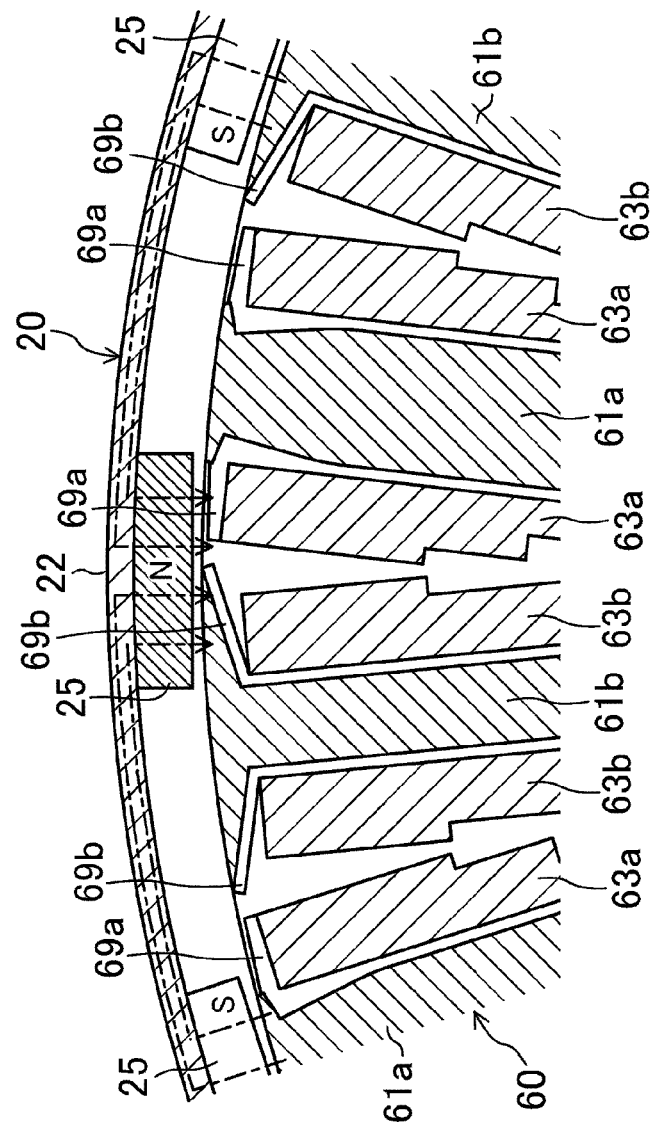
FIG. 8 illustrates a top cross-sectional view of a movement path of a magnetic flux.

As shown in FIG. 8, a magnetic flux out of N-pole of the outer magnets 24 passes through the inner rotor 30 through the teeth 61, enters S-pole of the outer magnets 24 through other teeth 61, and enters N-pole of the outer magnets 24 through the rotor yoke 22.

Here, when the number of magnetic poles of the outer rotor 20 is twenty, since an air gap, which is a gap between the outer magnets 24 having N-pole and the teeth 61, is smaller than a case of 40 poles, an induced voltage increases. Accordingly, in washing in which low speed and high torque are necessary, the outer rotor 20 may have twenty magnetic poles.

Figure 10:
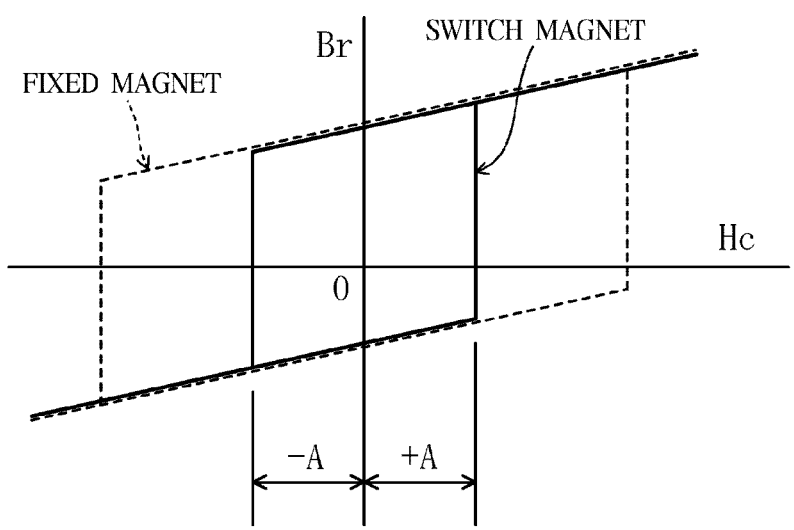
FIG. 10 illustrates a view of a curve B-H when magnets having different coercive forces are used for a fixed magnet and a switch magnet.

FIG. 10 is a view illustrating a curve B-H (a magnetic hysteresis curve) in a case in which magnets having different coercive forces are used for the fixed magnets 35 and the switch magnets 25.

When a magnetic field, which is equal to or greater than +A and equal to or smaller than −A and does not exceed a coercive force of the fixed magnet 35, is generated by applying a magnetization current to the coil 63, it is possible to reverse a magnetic polarity of the switch magnet 25 as seen from the drawing. A current to be magnetized may be a pulse current and may be magnetized in a time of several tens of milliseconds.

In magnetizing the switch magnet 25, a voltage applied to the coil 63 may be as high as possible to increase a magnetization current. Also, when high-speed rotation like spin-drying is performed, a high voltage is advantageous. However, when high torque is required like a case of low-speed rotation such as washing, rinsing, or the like, a voltage which is not too high is generally advantageous to an effective aspect of the inverter 18.

Accordingly, in the embodiment, a voltage equal to a voltage of magnetization is supplied to the inverter 18 during magnetization and spin-drying and a voltage lower than a magnetization voltage is supplied to the inverter 18 during washing. Accordingly, power consumption may be reduced.

—Effect of Operation of Partitioned Core According to Embodiment—

Next, an increase in a magnetization rate of a partitioned core and stabilization of magnetization according to an embodiment will be described in detail.

Figure 11A:
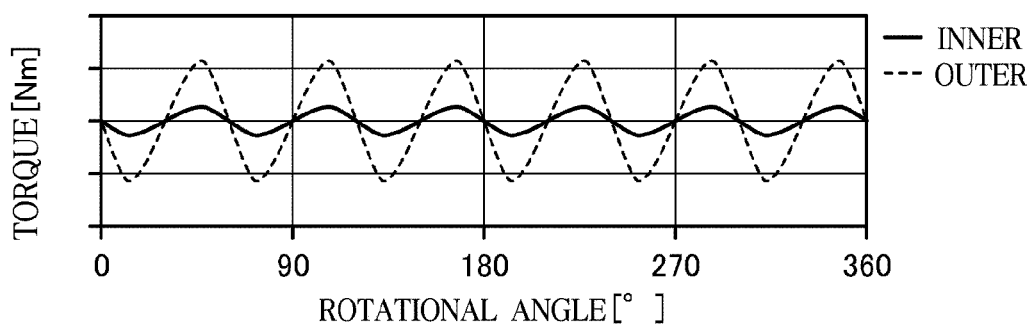
FIGS. 11A and 11B illustrate views of results of interpreting cogging torque in a washing operation.
Figure 11B:
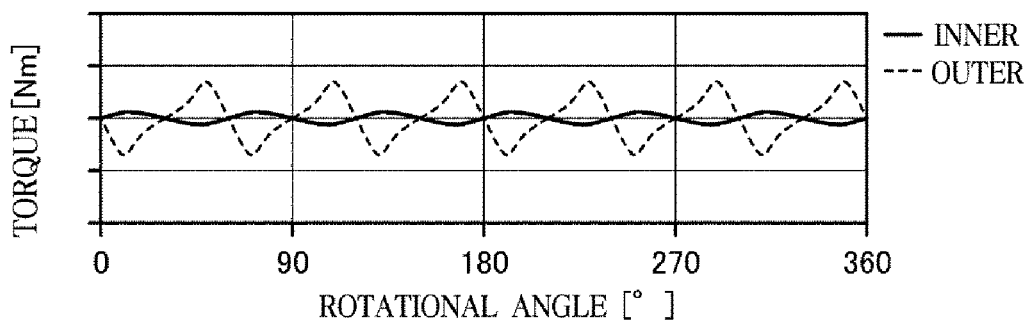

FIGS. 11A and 11B illustrate results of checking a level of ripples of cogging torque in a washing operation mode (contrary driving mode) when the motor according to the embodiment is mounted on a washing machine. FIG. 11A illustrates a result of applying a motor including a partitioned core having the same teeth shape to a washing machine, and FIG. 11B illustrates a result of applying a motor including a partitioned core according to the embodiment to a washing machine.

As shown in FIGS. 11A and 11B, when the motor 12 according to the embodiment is applied, cogging phases of sides of the inner rotor 30 and the outer rotor 20 may be approximately reversed while decreasing ripples of cogging torque of each of the inner rotor 30 and the outer rotor 20, and reduction in cogging may be promoted.

Figure 12A:
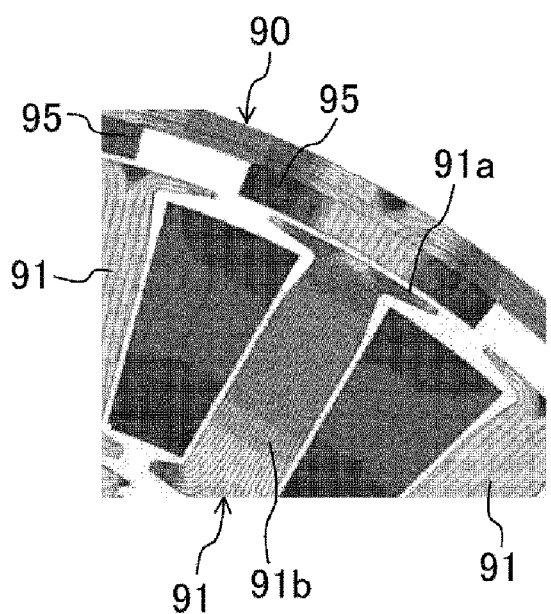
FIGS. 12A and 12B illustrate views of results of interpreting a magnetic flux.
Figure 12B:
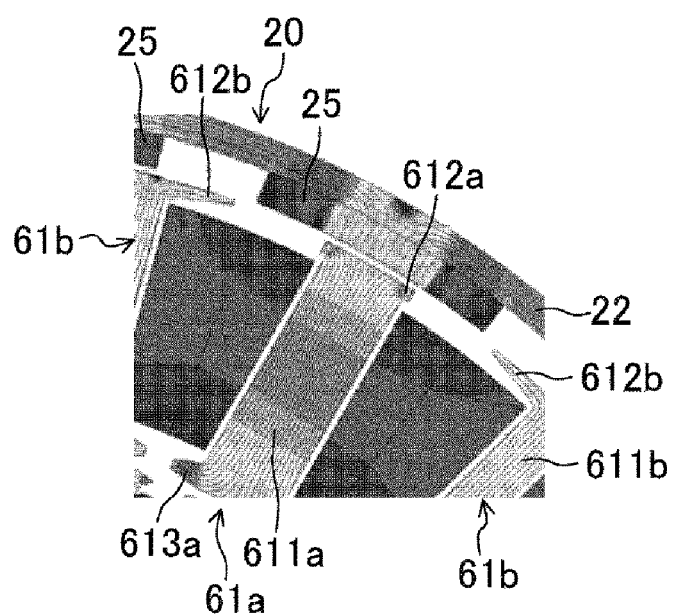

FIGS. 12A and 12B are views schematically illustrating results of analyzing magnetic flux flows with respect to the first teeth 61a and the outer rotor 20 including the switch magnets 25. FIG. 12A illustrates a result of analyzing a case of applying a configuration according to a conventional technology (hereinafter, simply referred to as a conventional configuration), and FIG. 12B illustrates a result of analyzing a case of applying a configuration according to the embodiment (hereinafter, simply referred to as an example of the present configuration).

In the conventional configuration, all teeth 91 are provided to have the same shape. In detail, a width of an outer step portion 91a of the teeth 91 is provided to be greater than a width of a teeth body portion 91b. This is for securing a surface area of the outer step portion 91a facing a switch magnet 95 of an outer rotor 90 and for obtaining necessary torque. As a result thereof, as shown in FIG. 12A, it is possible to concentrate a magnetic field at the teeth body portion 91b and a part of the outer step portion 91a close to the switch magnet 95. However, when magnetization is performed, a leakage of magnetic flux through the outer step portion 91a occurs such that a case in which it is impossible to obtain an adequate magnetization rate occurs.

In comparison to this, in the embodiment, a cross section of a magnetic path of the teeth body portion 611a is secured such that magnetic saturation decreases in the first teeth 61a. Also, to minimize a leakage of a magnetic flux in magnetization, a cross section of the outer step portion 612a is set to be smaller than that of the conventional configuration.

A cross section of a magnetic path of the teeth body portion 611b of the second teeth 61b is set to be smaller than a cross section of a magnetic path of the teeth body portion 611a of the first teeth 61a. Since the second teeth 61b are not used in magnetization, it is possible to reduce a cross section of the second teeth 61b to be smaller than the cross section of the magnetic path of the first teeth 61a and to be set according to necessary torque.

Accordingly, as shown in FIG. 12B, a magnetic field may be generated as large as possible at the first teeth 61a facing the switch magnet 25, the number of windings of the coil 63a facing the first teeth 61a may increase, and a magnetization rate of the switch magnet 25 may be increased. Also, in adequate magnetization, the number of windings of the coil 63b facing the second teeth 61b may be increased and torque of the motor 12 may be increased.

Figure 13:
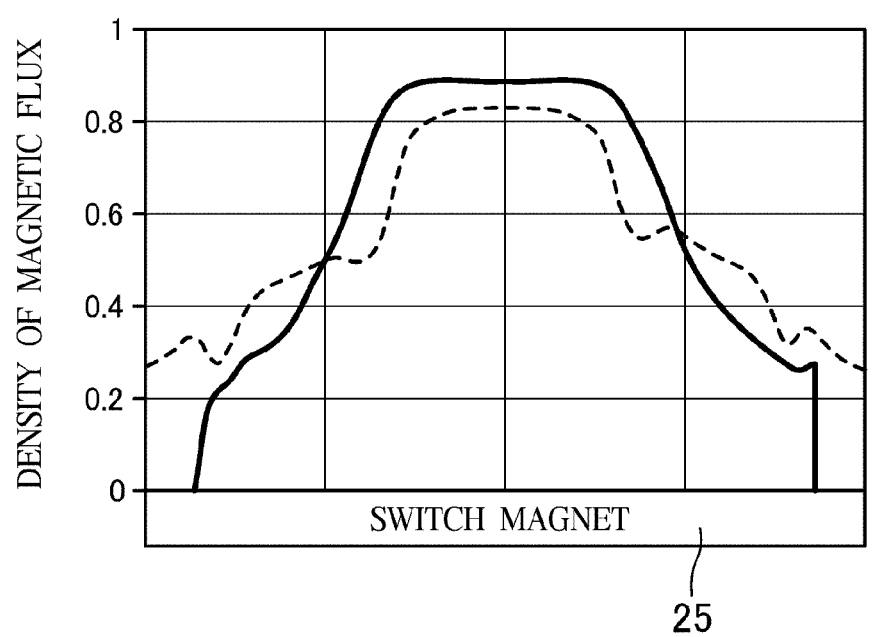
FIG. 13 illustrates a graph of a result of interpreting magnetic flux density of a surface of a magnet after magnetization.

FIG. 13 illustrates a result of analyzing density of a magnetic flux of a surface of the switch magnet 25 in the present configuration (a solid line in FIG. 13) and the conventional configuration (a broken line in FIG. 13).

As shown in FIG. 13, in comparison to the conventional configuration, a magnetization rate is drastically increased by applying the present configuration.

In order to compensate for a reduction in a facing area with the switch magnet 25 caused by reducing the outer step portion 612a of the first teeth 61a in comparison to the conventional configuration, a plurality of instances of magnetization may be performed by displacing a position in a circumferential direction in the present configuration.

Also, in the embodiment, a width of the outer step portion 612b of the second teeth 61b which does not face the switch magnet 25 is provided to be great. Also, since the width of the teeth body portion 611b of the second teeth 61b is provided to be relatively narrow, it is possible to secure a number of windings necessary for the second coil 63b wound on the second teeth 61b. Accordingly, it is possible to secure torque necessary for driving the motor.

—Configuration of Bipartitional Stator—
(Overall Configuration)

Next, an arrangement relationship among a three-phased coil, the first teeth 61a, and the second teeth 61b shown in FIG. 9 will be described while being applied to a bipartitional stator.

Figure 14:
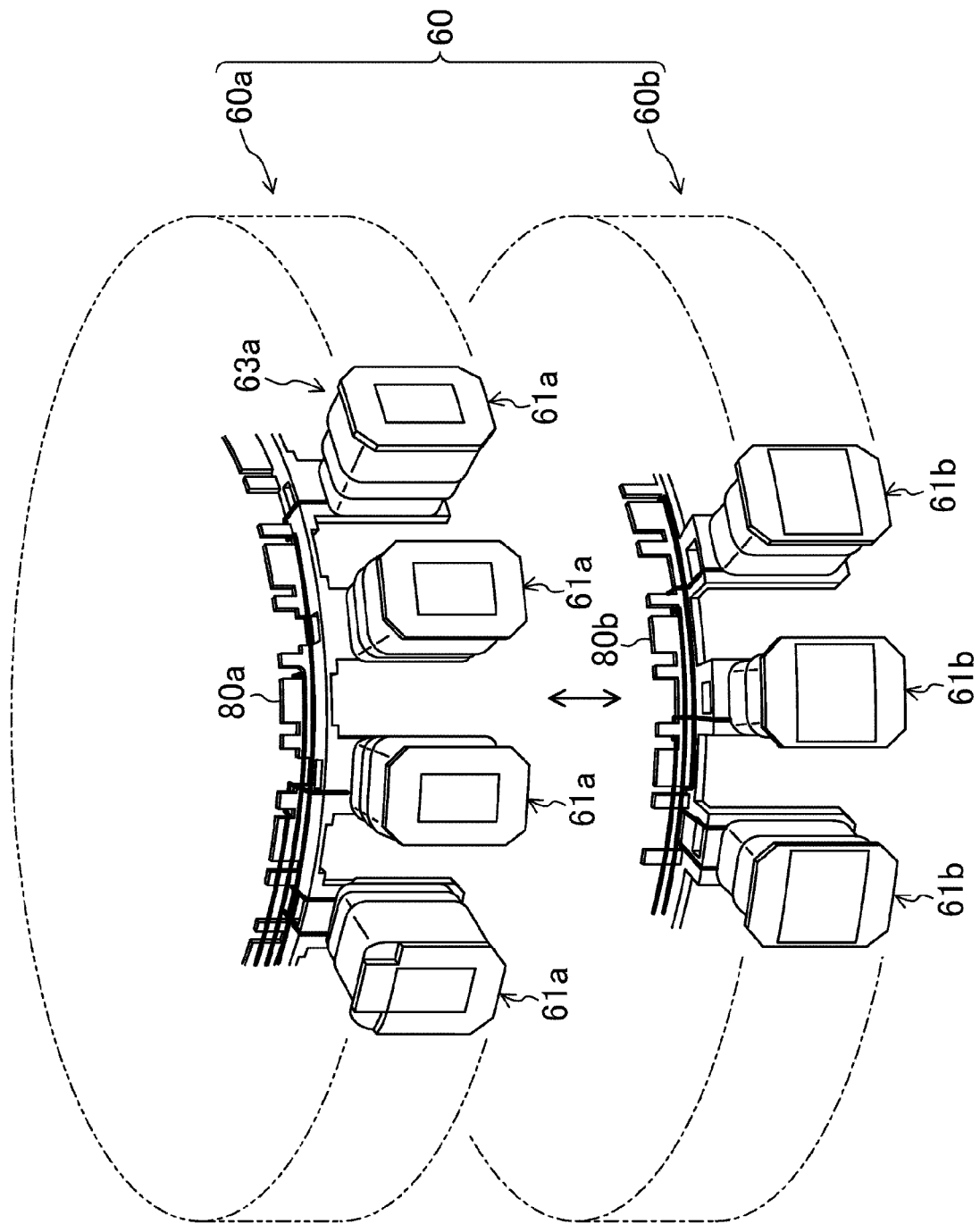
FIG. 14 illustrates an exploded perspective view of an example of a configuration of a bipartitional stator.
Figure 15:
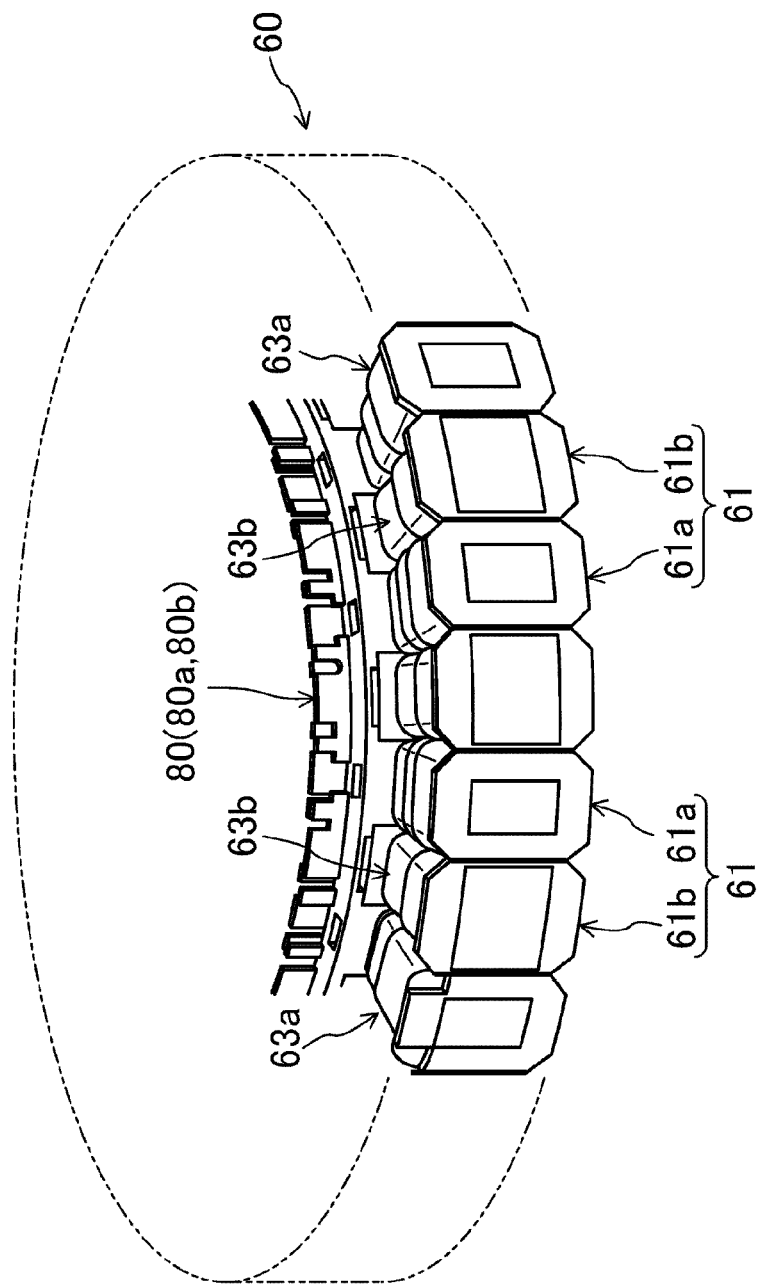
FIG. 15 illustrates a perspective view of an example of a configuration of the bipartitional stator after being assembled.

FIG. 14 illustrates an example of a configuration of a bipartitional stator, and FIG. 15 illustrates an example of a configuration after assembling the bipartitional stator.

As shown in FIG. 14, the stator 60 (the bipartitional stator) includes an annular first stator 60a shown in an upper part in the drawing and an annular second stator 60b shown in a lower part in the drawing.

The first stator 60a includes a plurality of such first teeth 61a which are arranged while being partitioned at uniform intervals in a circumferential direction and extend in a diameter direction. Likewise, the second stator 60b includes a plurality of such second teeth 61b which are arranged while being partitioned at uniform intervals in a circumferential direction and extend in a diameter direction.

As shown in FIG. 15, the first stator 60a and the second stator 60b are assembled in a motor shaft direction.

In detail, the first stator 60a is allowed to face a bottom in an axial direction and the stator 60b is allowed to face a top in an axial direction so as to be easily combined. Here, a connecting line 83 of the first stator 60*a* is disposed outside a connecting line 83 of the second stator 60*b* (refer to FIG. 18).

The first teeth 61*a* and the second teeth 61*b* are configured so as to be adjacent to each other, that is, to be alternately aligned in a circumferential direction.

The uniform intervals are intervals formed to insert the teeth 61 of an opposing side for assembling (for example, the second teeth 61*b*) between the adjacent teeth 61 (for example, between the first teeth 61*a*). A teeth interval (for example, an interval between the first teeth 61*a*) may be slightly wider than a width of the opposing teeth 61 (for example, the second teeth 61*b*). The teeth interval (for example, the first teeth 61*a*) is slightly narrower than the width of the teeth 61 (for example, the second teeth 61*b*) such that the first teeth 61*a* and the second teeth 61*b* may be configured to come into forcible contact with each other.

Also, three shapes (a U shape, a V shape, and a W shape) may be sequentially configured by performing connection which will be described. Accordingly, the three-phased stator 60 having windings for the first teeth 61*a* of 30 and windings for the second teeth 61*b* may be configured using ten core coils for each shape.

As described above, in a configuration according to the embodiment, in the stator 60, even in a structure in which shapes of adjacent teeth (the first teeth 61*a* and the second teeth 61*b*) are different, the stator 60 is partitioned into the first stator 60*a* and the second stator 60*b* and each of them may be separately wound. Accordingly, an aligning property and a coil space factor may be increased without a limit in a space for a nozzle or a nozzle track in winding.

Also, a plurality of nozzles may be wound at the same time, ease of winding may increase, and productivity may be improved.

The outer step portion 692*a* of the insulator 69*a*, which forms the first teeth 61*a*, and the outer step portion 692*b* of the insulator 69*b*, which forms the second teeth 61*b*, which are adjacently arranged, may be fixed to each other to reduce vibration and noise. Here, fixing is a concept including substantial fixing. For example, a fixed state through fusion and the like of a resin may be included for productivity or cost performance. Also, a state in which the adjacent outer step portions 692*a* and 692*b* are configured to be pressure-welded with each other and to be substantially fixed may be included.

The first teeth 61*a* having the same shape are arranged at equivalent pitches (pitches at 24 mechanical degrees) in a circumferential direction in the first stator 60*a*. Also, the first coil 63*a* is formed by performing a regulated number of windings on the insulator 69*a* which covers the first teeth 61*a*.

A coil may be wound on a nozzle or a flyer. Since the first stator 60*a* includes only the first teeth 61*a*, a plurality of simultaneous windings such as three windings and the like are available.

The connecting line 83, which connects the same shapes (U shapes, V shapes, and W shapes), is disposed at an annular connecting portion 80*a* which connects insides of the first teeth 61*a* arranged in an annular shape. In the embodiment, each of the U shape, V shape, and W shape includes five windings, and the first stator 60*a* includes fifteen large core windings.

The second teeth 61*b* having the same shape are arranged at equivalent pitches (pitches at 24 mechanical degrees) in a circumferential direction in the second stator 60*b*. Also, the second coil 63*b* is formed by performing a regulated number of windings on the insulator 69*b* which covers the second teeth 61*b*.

A coil may be wound on a nozzle or a flyer. Since the second stator 60*b* includes only the second teeth 61*b*, a plurality of simultaneous windings, such as three windings and the like, are available.

A connecting line, which connects the same shapes (U shapes, V shapes, and W shapes), is disposed at an annular connecting portion 80*b* which connects insides of the second teeth 61*b* arranged in an annular shape. In the embodiment, each of the U shape, V shape, and W shape includes five windings, and the second stator 60*b* includes fifteen large core windings.

(Configuration of Winding)

Next, a detailed configuration of winding will be described.

FIG. 16 is a cross-sectional view illustrating the first teeth 61*a* and the second teeth 61*b* including the insulators 69*a* and 69*b*. In FIG. 16, in the case of alignment winding, a cross section of one side part (a right half in the drawing) of the first coil 63*a* as a winding portion of the first teeth 61*a* and a cross section of one side (a left half of the drawing) of the second coil 63*b* as a winding portion of the second teeth 61*b* are illustrated.

As shown in FIG. 16, a protrusion amount W4*a* of the first insulator 69*a* which protrudes from an end portion of the outer step portion 612*a* facing the first teeth 61*a* is provided to be greater than a protrusion amount W4*b* of the insulator 69*b* facing the second teeth 61*b*. Accordingly, a large number of windings may be performed near the outer step portion 612*a* and a magnetization rate may be increased.

Also, a distance from a center of the stator 60 to an outer end of the second coil 63*b* is set to be smaller than a distance from the center of the stator 60 to an outer end of the first coil 63*a* so as to perform a larger number of windings on an outside of the first coil 63*a*. Accordingly, a magnetization rate may be improved.

In detail, the winding of the first coil 63*a* is concentrated on an outer circumferential side close to the switch magnet 25. Also, the first coil 63*a* is wound in multiple layers to protrude outward from the first step width W2*a* of the first teeth 61*a* in a circumferential direction. As described above, since a large number of windings of the first coil 63*a* are performed at a position close to an outer circumference, a magnetization rate of the switch magnet may be improved by the first teeth 61 including the first coil 63*a*.

The second coil 63*b* is wound a necessary number of windings with a small number of layers to be located further inside than the second outer step portion W2*b* of the second teeth 61*b* in a circumferential direction. That is, the number of windings of the second coil 63*b* is configured to be less, and the number of windings of the first coil 63*a* is configured to be larger than the number of windings of the second coil 63*b*. Accordingly, a magnetization rate may be further improved.

As described above, since the first stator 60*a* and the second stator 60*b* are separately wound, when the adjacent insulators 69*a* and 69*b* are configured, a mutual distance to a position where the outer step portions 692*a* and 692*b* come into contact with each other may be set to be narrow. Also, a distance W11 between outermost layers of the first coil 63*a* and the second coil 63*b* which face each other may also be set to be close to a minimum gap determined in consideration of a deviation in manufacturing.

Figure 17A:
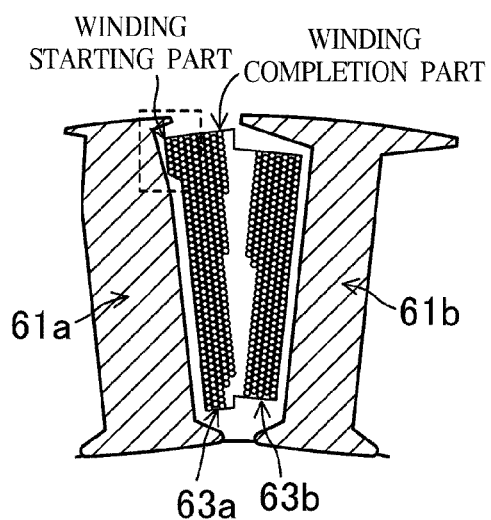
FIGS. 17A to 17C illustrate views of a coil winding structure and a coil winding method.
Figure 17B:
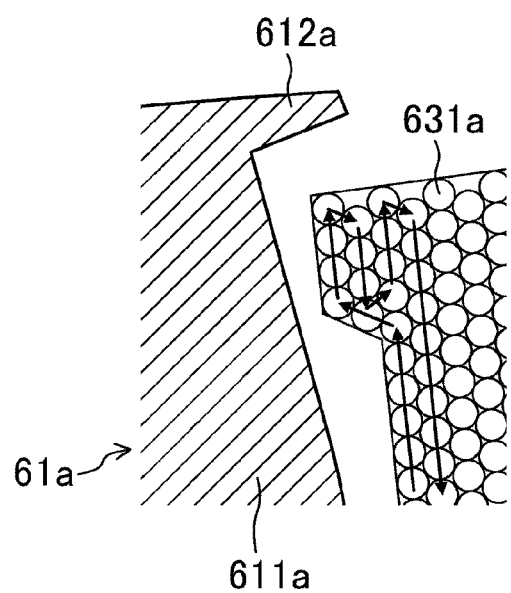
Figure 17C:
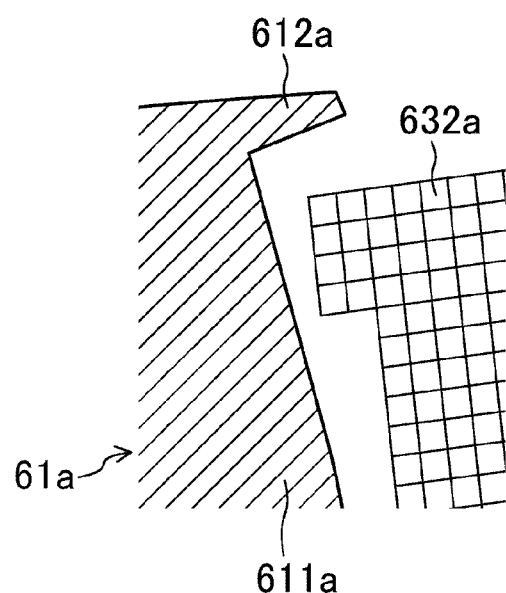
Figure 33:
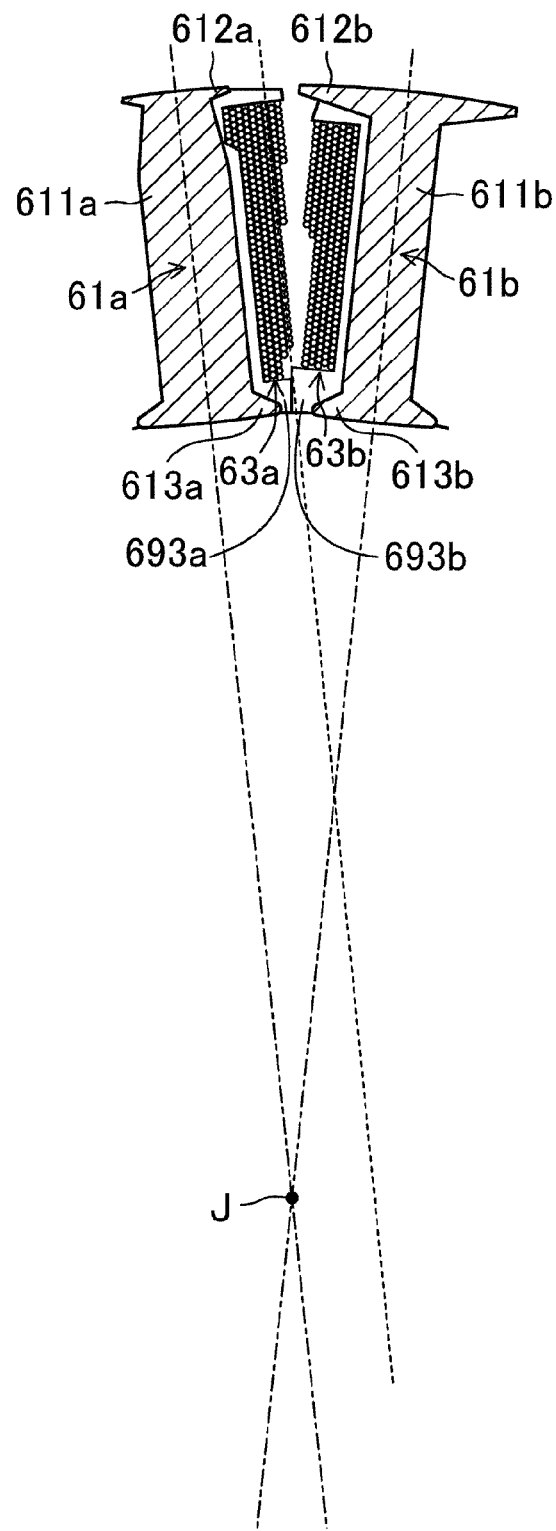
FIG. 33 illustrates a view of a coil winding structure.

The coil 63*a* may be configured as shown in FIGS. 17A to 17C (FIG. 33). In FIGS. 17A and 17B, the number of windings of the end portion of the outer circumferential part of the coil 63a is further increased. Also, FIG. 17C illustrates an example of using an angular winding.

In detail, in FIGS. 17A and 17B, an outer end of the teeth body portion 611a of the first teeth 61a is thin and a recess portion, which is formed to be concave in a circumferential direction, is formed. A coil is wound in two layers on the recess portion.

FIG. 17A illustrates an example in which a coil is wound as much for eight turns of coils at an end (recess portion) at an upper part in the drawing. As described above, when the switch magnet 25 is magnetized by winding a larger number of coils on a front end, a magnetization force may increase, magnetization may be stabilized, and a magnetization rate may be increased.

FIG. 17B is an enlarged view illustrating an inside area of a broken line shown in FIG. 17A, and an order of winding is shown by an arrow. A coil is wound in the above order such that winding may be performed without deteriorating an aligning property.

Also, as shown in FIG. 17C, a winding workability of a recess portion (a two-layer structure part) may be more easily provided by using an angular or rectangular wire.

According to the configuration as shown in FIGS. 17A to 17C, as shown in FIG. 33, a straight line (refer to FIG. 33 for the broken line) which connects an intermediate point (a first intermediate point of a connecting side) between the inner step portion 613a of the first teeth 61a and the inner step portion 613b of the second teeth 61b which are adjacent to each other to an intermediate point (corresponding to a first intermediate point of a slot-opened side) between the outer step portion 612a of the first teeth 61a and the outer step portion 612b of the second teeth 61b is provided not to pass a motor rotating axis J.

Also, FIG. 17A illustrates positions of a winding starting part and a winding completion part of the coil 63.

Figure 18:
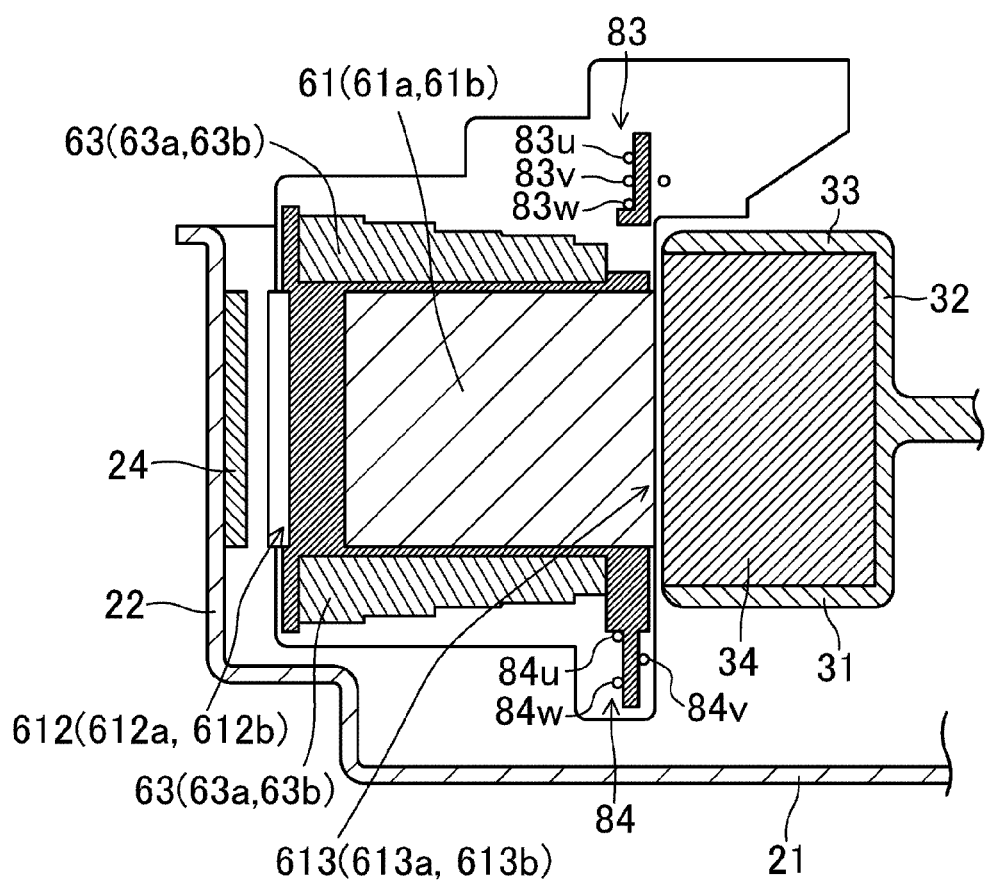
FIG. 18 illustrates an enlarged schematic longitudinal cross-sectional view of a stator portion and a rotor portion shown in FIG. 3.

In order to stabilize the switch magnet and to increase the magnetization rate, a magnetization force may be concentrated on a part of the outer step portion 612 toward the switch magnet 25. Accordingly, the coil 63 may be wound to be as close to the switch magnet 25 as possible, and, additionally, a large number of windings is preferable. Accordingly, as shown in FIG. 18, a connecting line is provided to be treated near a top of the inner step portion 613 of the teeth 61.

Also, the winding starting part and the winding completion part of the coil 63 are arranged near the outer step portion 612 such that a larger number of windings are easily performed, a treatment of the ends of a winding start and a winding completion of the coil are easy, and a manufacturing property is improved.

A detailed arrangement of the connecting line will be described below in detail.

(Arrangement of Connecting Line)

Figure 19:
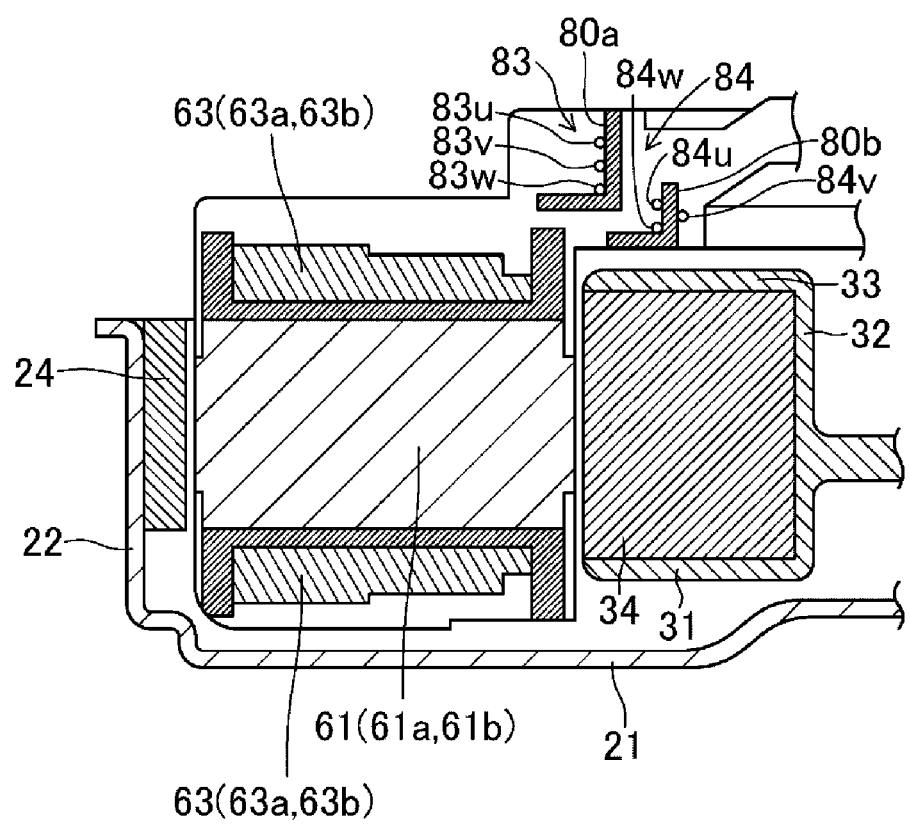
FIG. 19 illustrates a schematic longitudinal cross-sectional view of a modified example of the stator portion and the rotor portion.

Next, an arrangement of the connecting line of the bipartitional stator will be described in detail. FIGS. 18 and 19 illustrate examples of arrangement of connecting lines of the first stator 60a and the second stator 60b.

As shown in FIG. 18, connecting lines 83, 83u, 83v, and 83w of the first stator 60a are arranged above the stator 60 in the drawing, and connecting lines 84, 84u, 84v, and 84w of the second stator 60b are arranged below the stator 60 in the drawing.

Accordingly, a configuration of the connecting lines 83 and 84 may be simplified and the first stator 60a and the second stator 60b may be easily assembled.

Also, since a position of a connecting line treatment portion of the second stator 60b is disposed between an inner circumferential end and an outer circumferential end of the second teeth 61b, the outer rotor 20 and the inner rotor 30 may be assembled later. Through a configuration shown in FIG. 18, a space and strength of the connecting line treatment portion is secured and reliability and a manufacturing property is increased.

As shown in FIG. 19, the connecting lines 83, 83u, 83v, and 83w of the first stator 60a and the connecting lines 84, 84u, 84v, and 84w of the second stator 60b may be approximately flush with each other and may be arranged further inside than an inner circumferential end of each of the teeth 61.

Also, the connecting lines 83, 83u, 83v, and 83w of the first stator 60a and the connecting lines 84, 84u, 84v, and 84w of the second stator 60b may be arranged near mounting portions of the stators 60: 60a and 60b formed of a thermosetting resin material (in a rightward upper part in the drawing).

Accordingly, while thicknesses of the first stator 60a and the second stator 60b are not increased on the basis of the drawing, the thicknesses of the first stator 60a and the second stator 60b may be decreased on the basis of the drawing. Accordingly, a thin dual-rotor motor is available.

Also, the connecting lines 83 and 84 may be configured to be short.

Also, in the first stator 60a and the second stator 60b, the connecting lines may be easily arranged by employing an outer winding method of winding a coil from the outside.

FIGS. 20A to 20G are views illustrating main parts of the connecting lines.

Here, different phases of the connecting lines 83 and 84 may not come into contact with each other. Accordingly, three-phased connecting lines 83u, 83v, 83w, 84u, 84v, and 84w are aligned to be approximately parallel to an axial direction of arc-shaped wall portions 81a and 81b and arranged along wall surfaces 811a, 812a, 811b, and 812b of the wall portions 81a and 81b.

Figure 20A:
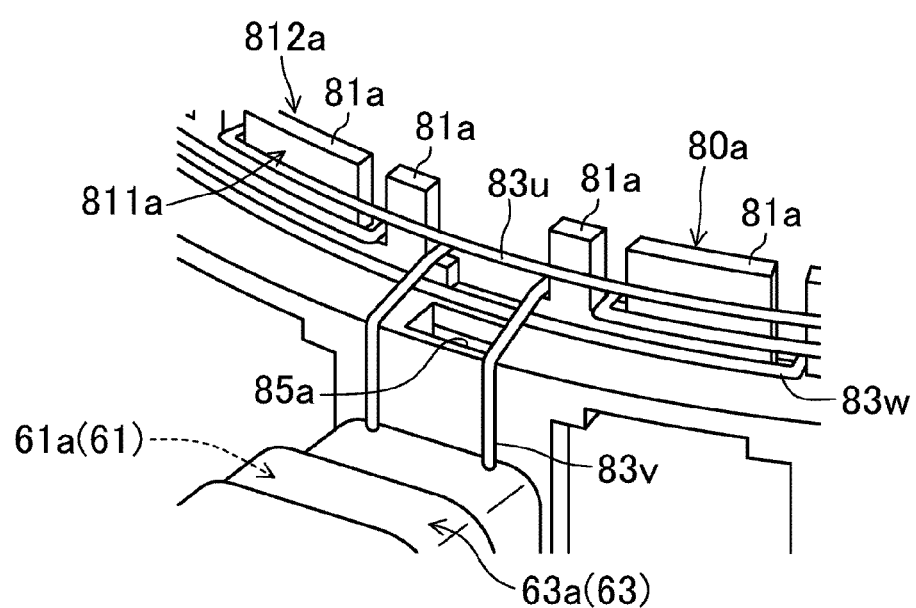
FIGS. 20A to 20C illustrate partial enlarged perspective views of a configuration of a connecting line of the bipartitional stator.
Figure 20B:
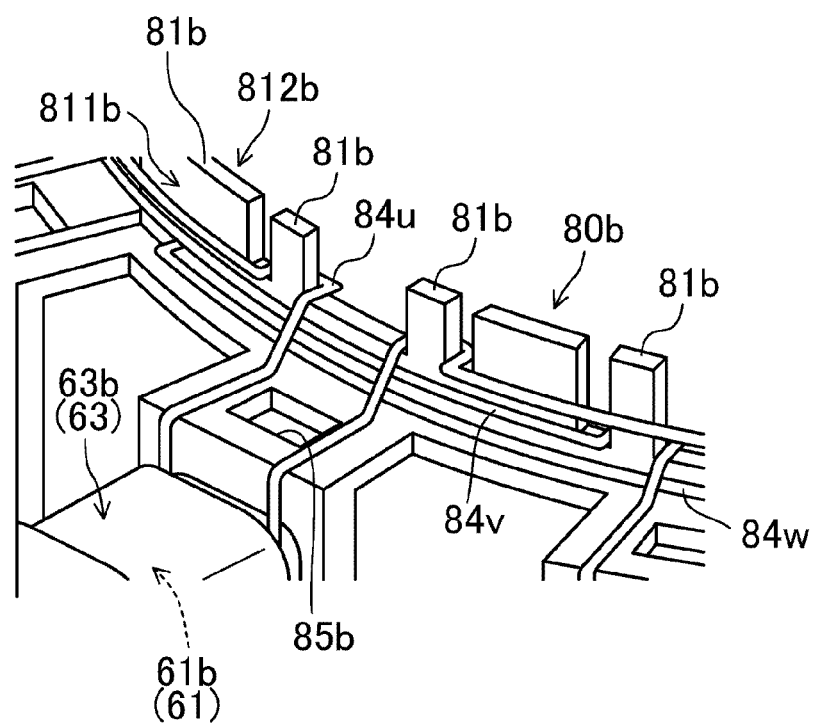
Figure 20C:
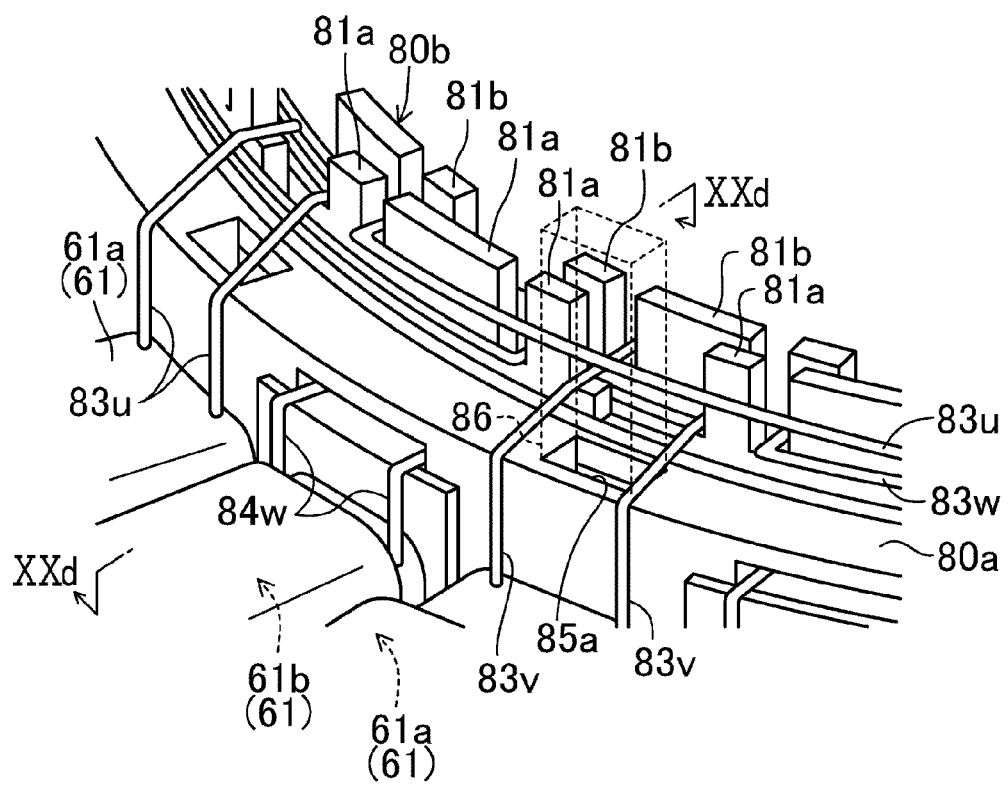
Figure 20D:
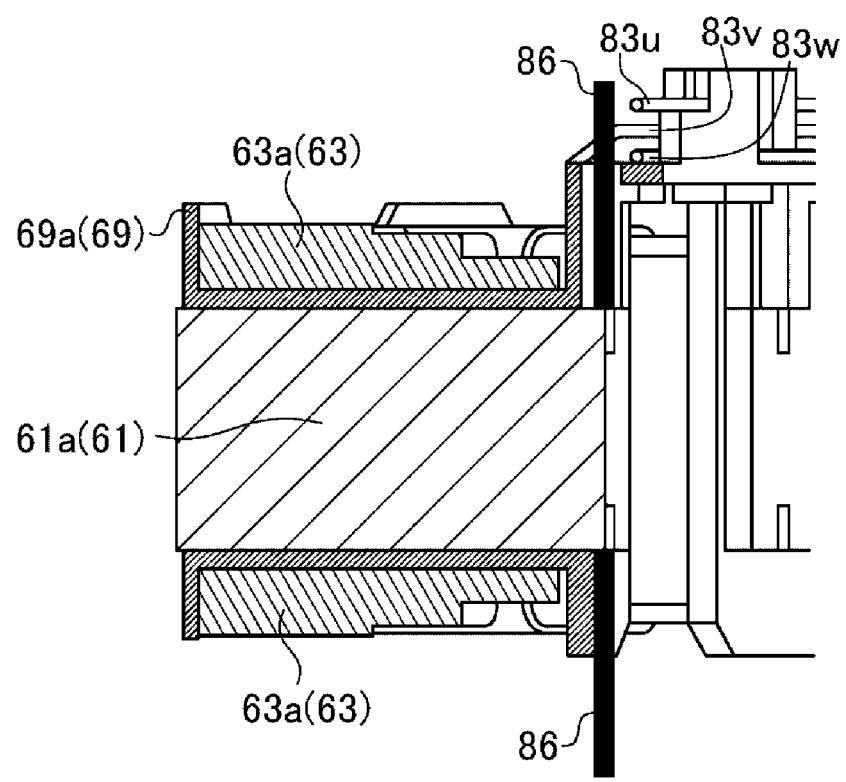
FIG. 20D illustrate a cross-sectional view taken along a line XXd-XXd of FIG. 20C.

The winding starting part and the winding completion part of the coil wound on each of the first teeth 61a and the second teeth 61b are arranged along a wall surface opposite the different phases in the arc-shaped wall portion so as not to allow the different phases to directly cross each other (refer to FIGS. 20A to 20C).

As shown in FIG. 20C, the winding start and the winding completion of the coil of the second stator 60b form a relaxation portion having an arbitrary length (refer to the drawing for the connecting line 84u in the middle thereof). Accordingly, as shown in FIG. 20C, when the first stator 60a and the second stator 60b are assembled, tension may not be applied to the connecting line 84 and the different shapes may be prevented from directly crossing while heights of component parts of the connecting line are suppressed.

In FIGS. 18 to 20G, a structure in which the connecting lines 83 and 84 are arranged inside the stator 60 has been described but the present disclosure is not limited thereto. For example, a mounting position of the stator 60 and an arrangement position of the connecting lines 83 and 84 may be arranged outside the stator 60 having an annular shape.

(Fixing of Work 1)

Next, a method of fixing a work will be described in detail with reference to FIGS. 20A to 20F.

In winding of the coil 63, in order to wind a linear element by applying uniform tension thereto, it is necessary to completely fix a winding portion to increase an aligning property.

In the embodiment, although the stator 60 is configured as partitioned teeth partitioned for each the coil 63 (winding portion) and the connecting portion 80: 80a or 80b of the partitioned teeth are formed of a resin (insulator), fixing only through a resin may have low strength.

Accordingly, to completely fix the teeth 61, a through hole 85: 85a or 85b for fixing the work and passing through the insulator (connecting portion) 80a or 80b in the axial direction of the stator 60 is provided near an inner circumferential part of the teeth 61: 61a or 61b and a center of the insulator 69: 69a or 69b on which a coil is wound.

Accordingly, the coil 63 may be wound by inserting a fixing chuck 86 while being wound.

The winding starting part and the winding completion part of the winding of the coil 63 may be arranged near both sides of the through hole 85: 85a or 85b.

(Fixing of Work 2)

Next, a method of fixing a work according to another embodiment will be described with reference to FIGS. 20A to 20F.

Figure 20E:
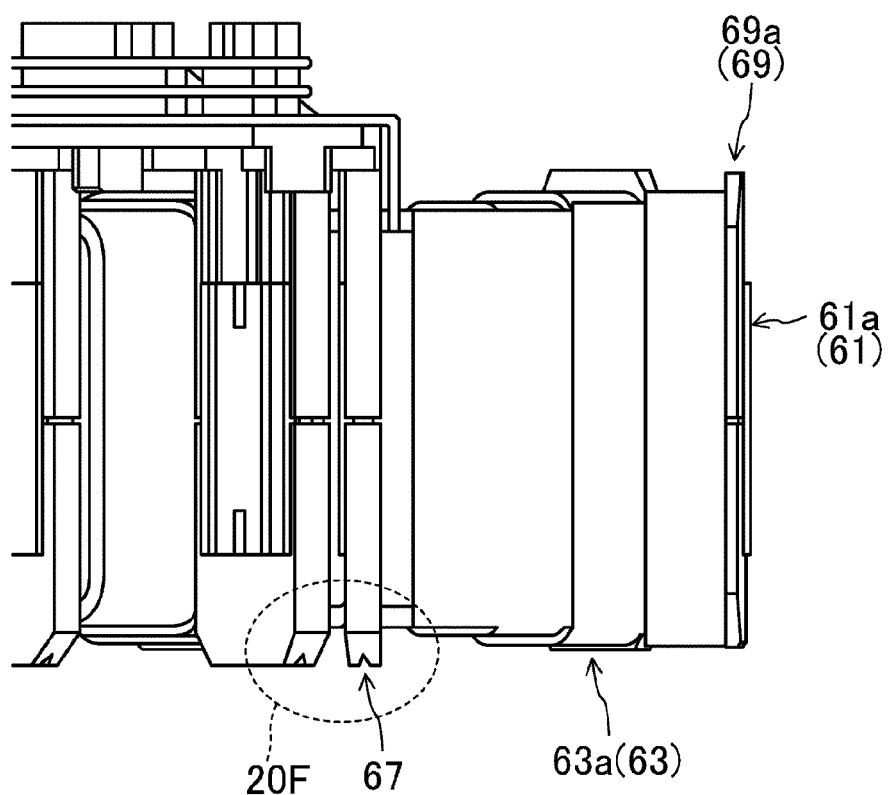
FIG. 20E illustrate a side view of a method of fixing a work.
Figure 20F:
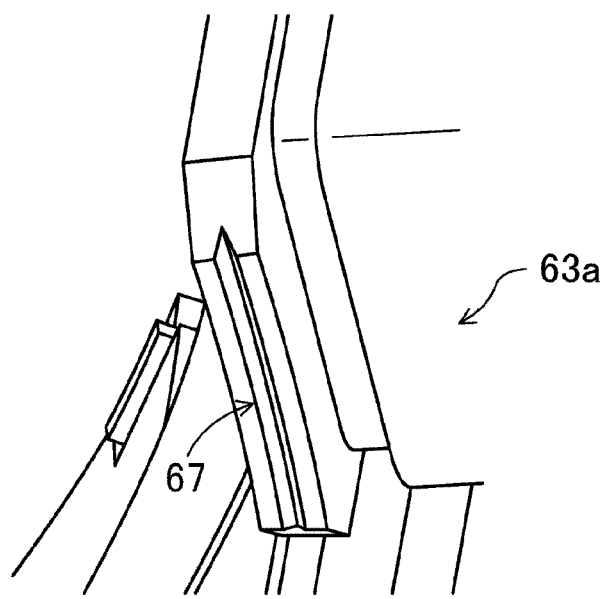
FIG. 20F illustrate a partial enlarged perspective view of an enlarged interior of a broken line of FIG. 20E.

FIG. 20F is an enlarged view illustrating a main part (an area inside a broken line) of FIG. 20E.

As shown in FIG. 20E, a V groove 67 is formed below the insulator 69.

In winding of the coil 63, the winding portion (insulator) 69 may be completely fixed by inserting a work fixing chuck into the V groove 67. Accordingly, it is possible to stably align and wind the coil.

A shape of a work fixing portion is not limited to a V-shaped groove like the V groove 67 and may have a tapered surface in an axial direction like the V groove 67. As described above, a jig may be easily inserted, and stability after combining the work fixing chuck may be improved.

Also, although not shown in the drawing, a groove like the V groove 67 and a chamfer portion are formed on both top and bottom parts or one of the top and bottom parts such that stability may be more improved.

A groove shape of the V groove 67 may be a linear shape or may be an arc shape along an annular shape of the teeth 61. The groove shape of the V groove 67 is an arc shape such that the work fixing chuck may be easily combined and fixed and stability is improved. Also, it is possible to easily rotate the work in winding as necessary.

(Configuration of Connecting Portion)

As shown in FIGS. 20A to 20G, the insulators (connection portions) 80a and 80b of the first stator 60a and the second stator 60b are formed of a resin material and integrally molded with the teeth 61a and 61b, each of which there are fifteen, respectively.

Although not shown in the drawing, the insulator 69 may be configured as a cover shape with separate top and bottom. However, in the above-described structure, a shape of an upper insulator and a shape of a lower insulator are different from each other. Also, since additional fifteen components are further necessary for the lower insulator, productivity is decreased.

Figure 20G:
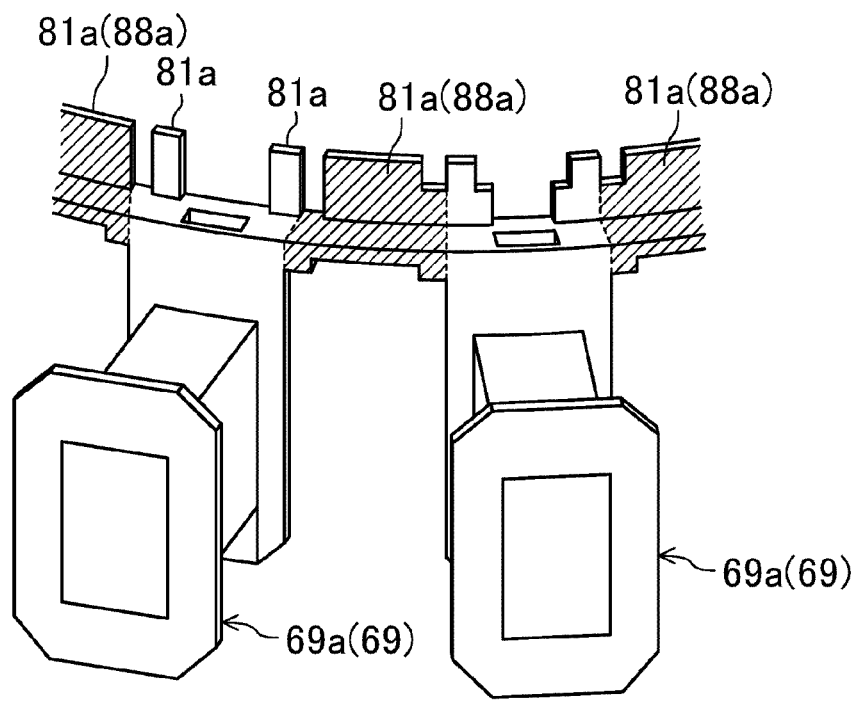
FIG. 20G illustrates a partial enlarged perspective view of a configuration of a connection portion.

Accordingly, in the embodiment, as shown in FIG. 20G, the upper insulator and the lower insulator may be integrally formed by insert-molding. Accordingly, the number of components is reduced and productivity is improved.

Also, strength of a connecting part 88a between teeth 61 shown as a diagonal line in FIG. 20G may be increased.

In detail, for example, the strength of the connecting part 88a may be increased by using a resin having high strength through dichromatic molding and the like or insert-molding of an additional component.

Accordingly, a handling property and reliability in a manufacturing process are improved and winding is easy.

(Switch of Connection)

Next, connection and switching of the coil 63 will be described.

FIG. 21 illustrates states of windings of the first stator 60a (on a top end in the drawing), the second stator 60b (a middle of the drawing), and a combination thereof. A winding start corresponds to teeth numbers No. 1 to No. 6, and a winding completion corresponds to teeth numbers No. 25 to No. 30 in the drawing. In the drawing, a dot hatch is displayed on corresponding parts.

Figure 22:
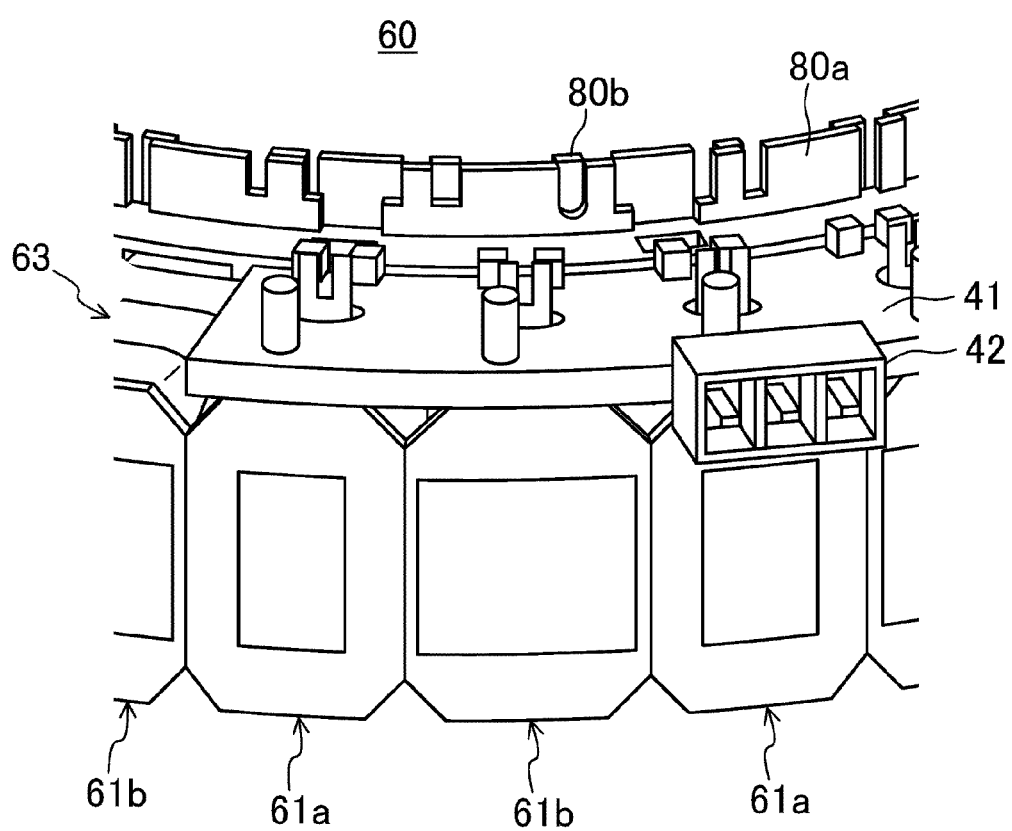
FIG. 22 illustrates a perspective view of a state in which a terminal block is mounted on the bipartitional stator.

FIG. 22 illustrates a state of mounting a terminal support 41 on the stator 60. A winding start point and a winding completion portion of each of the coils 63 are connected to the terminal support 41 through welding, calking, soldering, and the like.

Although not shown in the drawing, necessary wires are provided in the terminal support by an insert-molded conducting material. Also, an external connection terminal 42 electrically connected to the outside is installed at the terminal support 41.

FIG. 22 illustrates an example of the external connection terminal 42 having three terminals, but the number of terminals of the external connection terminal 42 is not limited thereto. For example, the external connection terminal 42 may include twelve terminals equal to those of the winding starting part and the winding completion part and may be connected to a connection switch part (not shown) outside the stator 60.

Also, when connection of the connection switch portion is switched, a change in winding with respect to a three-phase, Y connection, a Δ connection, and a 6-phased connection is possible. For example, the connection switch portion may change a connection in at least two of a washing operation, a rinsing operation, and a spin-drying operation. For example, connection for low speed and high torque, connection for high speed and low torque, connection for magnetization, and the like may be adequately selected.

OTHER EMBODIMENTS

In the embodiment, although a position of the inner rotor 30 is recognized by a position sensor (not shown) installed near the second teeth 61b to apply a three-phased current, the present disclosure is not limited thereto.

For example, instead of the position sensor, a magnetic sensor which detects magnets of the inner rotor 30 or the outer rotor 20 may be used. Also, a so-called sensorless method such as using induced voltage or a detected current may be employed. Also, a three-phased current may be applied by using other methods, such as an encoder and the like.

Also, although not shown in the drawing, for example, when a position detection means is installed and a three-phased coil current flows along a position of one of the inner rotor and the outer rotor, the other rotor rotates while being tuned to a change in current. Accordingly, to prevent out of phase caused by an increase in a load, a great change in a load, or the like, control may be performed using a current, torque, a phase, and the like. Accordingly, both rotors may be stably rotated.

Also, in the embodiment, a structure in which thirty stators and thirty slots (teeth) are present and the number of poles is switched between forty poles and twenty poles has been described as an example. However, it is possible to configure modes in which rotation modes are similar and numbers of rotations are different in additional combinations.

That is, when the number of magnetic poles of the inner rotor is 2N, it is possible to switch magnetic poles of the outer rotor between 2N and N.

As is apparent from the above description, a magnetization state may be stabilized and a magnetization property may be increased when an amount of magnetic flux of a magnet of a rotor.

Although a few embodiments of the present disclosure have been shown and described, it should be appreciated by those skilled in the art that changes may be made in these embodiments without departing from the principles and spirit of the present disclosure, the scope of which is defined in the claims and their equivalents.

Although the present disclosure has been described with various embodiments, various changes and modifications may be suggested to one skilled in the art. It is intended that the present disclosure encompass such changes and modifications as fall within the scope of the appended claims.

What is claimed is:

1. A motor comprising:
   a stator comprising a plurality of teeth arranged to be spaced apart in a circumferential direction of the stator; and
   a rotor comprising a plurality of magnets arranged inside or outside the stator and configured to rotate while electromagnetically interacting with the stator, wherein the plurality of magnets includes a switch magnet having a switchable magnetic polarity,
   wherein the plurality of teeth comprise first teeth having a first cross section and second teeth having a second cross section larger than the first cross section,
   wherein a magnetic polarity of the switch magnet is switched by the second teeth,
   wherein the rotor comprises an outer rotor disposed outside the stator and an inner rotor disposed inside the stator, and
   wherein one of the outer rotor and the inner rotor comprises the switch magnet.

2. The motor of claim 1, wherein the inner rotor comprises a plurality of rotor cores arranged to be spaced apart in a circumferential direction thereof and a plurality of first magnets arranged between the plurality of rotor cores, and
   wherein the plurality of first magnets are configured as fixed magnets whose magnetic polarity is not switched.

3. The motor of claim 2, wherein the outer rotor comprises:
   a rotor yoke formed in an annular shape; and
   a plurality of second magnets combined with an inner circumferential surface of the rotor yoke and arranged to be spaced apart along a circumferential direction of the outer rotor, and
   wherein the plurality of second magnets are configured as switch magnets.

4. The motor of claim 1, wherein the stator comprises a first coil wound on the first teeth and a second coil wound on the second teeth, and
   wherein a number of windings of the second coil is greater than a number of windings of the first coil.

5. The motor of claim 1, wherein each of the first teeth and the second teeth comprises:
   a teeth body portion extending in a diameter direction of the stator;
   an outer step portion extending from an outer end of the teeth body portion toward both sides in the circumferential direction of the stator; and
   an inner step portion extending from an inner end of the teeth body portion toward both sides in the circumferential direction of the stator.

6. The motor of claim 5, wherein a width of the outer step portion of the second teeth is narrower than a width of the outer step portion of the first teeth.

7. The motor of claim 5, wherein a width of the inner step portion of the second teeth is wider than a width of the inner step portion of the first teeth.

8. The motor of claim 1, wherein the first teeth and the second teeth are alternately arranged along the circumferential direction of the stator.

9. The motor of claim 1, wherein the stator comprises a first stator including a plurality of first teeth and a second stator including a plurality of second teeth, and
   wherein the first stator and the second stator are combined with each other in an axial direction of the stator so that the plurality of first teeth and the plurality of second teeth are adjacent to each other.

10. The motor of claim 9, wherein the stator comprises a plurality of first coils wound on the plurality of first teeth and a plurality of second coils wound on the plurality of second teeth, and
    wherein the plurality of first coils are connected by a first connecting line, and the plurality of second coils are connected by a second connecting line.

11. The motor of claim 10, wherein the first connecting line and the second connecting line are arranged above or below the inner rotor.

12. The motor of claim 10, wherein the first connecting line is disposed outside the second connecting line in a diameter direction of the inner rotor.

13. The motor of claim 10, wherein a withdrawal line portion of the first connecting line and a withdrawal line portion of the second connecting line are connected by a connection switch portion configured to switch between the first stator and the second stator.

14. The motor of claim 10, wherein in the first stator, a first winding space for winding the plurality of first coils is formed between outer ends of adjacent first teeth, and
    wherein in the second stator, a second winding space for winding the plurality of second coils is formed between outer ends of adjacent second teeth.

15. The motor of claim 9, wherein the stator comprises:
    a first insulator configured to cover the plurality of first teeth to insulate the plurality of first teeth; and
    a second insulator configured to cover the plurality of second teeth to insulate the plurality of second teeth.

16. The motor of claim 15, wherein each of the first insulator and the second insulator comprises:
    a body portion extending in a diameter direction of the stator;
    an outer step portion extending from an outer end of the body portion toward both sides in the circumferential direction of the stator; and
    an inner step portion extending from an inner end of the body portion toward both sides in the circumferential direction of the stator.

17. The motor of claim 16, wherein a width of the outer step portion of the second insulator is wider than a width of the outer step portion of the first insulator.

18. The motor of claim 15, wherein the first insulator comprises a groove combined with a fixing chuck for fixing the first teeth during a process of winding a first coil on the first teeth.

19. The motor of claim 1, further comprising a position sensor which detects a rotation position of the rotor,
   wherein the position sensor is disposed in a position closer to the first teeth than the second teeth.

* * * * *